(12) United States Patent
Dodds et al.

(10) Patent No.: US 10,254,786 B2
(45) Date of Patent: Apr. 9, 2019

(54) METHOD OF MAKING TRANSPARENT CONDUCTORS ON A SUBSTRATE

(71) Applicant: 3M INNOVATIVE PROPERTIES COMPANY, St. Paul, MN (US)

(72) Inventors: Shawn C. Dodds, St. Paul, MN (US); Matthew S. Stay, Minneapolis, MN (US); Mikhail L. Pekurovsky, Bloomington, MN (US); Matthew H. Frey, Cottage Grove, MN (US); Mark J. Pellerite, Woodbury, MN (US); John P. Baetzold, North St. Paul, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 280 days.

(21) Appl. No.: 14/649,979

(22) PCT Filed: Dec. 2, 2013

(86) PCT No.: PCT/US2013/072624
§ 371 (c)(1),
(2) Date: Jun. 5, 2015

(87) PCT Pub. No.: WO2014/088950
PCT Pub. Date: Jun. 12, 2014

(65) Prior Publication Data
US 2015/0316955 A1 Nov. 5, 2015

Related U.S. Application Data

(60) Provisional application No. 61/840,876, filed on Jun. 28, 2013, provisional application No. 61/782,634, (Continued)

(51) Int. Cl.
*G09G 3/36* (2006.01)
*G06F 1/16* (2006.01)
(Continued)

(52) U.S. Cl.
CPC ........... *G06F 1/16* (2013.01); *G06F 3/041* (2013.01); *G06F 3/0412* (2013.01); *B82B 1/002* (2013.01);
(Continued)

(58) Field of Classification Search
CPC ......... B82B 1/002; B82Y 15/00; B82Y 40/00; G06F 1/16; G06F 2203/04109;
(Continued)

(56) References Cited

U.S. PATENT DOCUMENTS

| 4,895,630 A | 1/1990 | Aufderheide |
| 6,037,005 A | 3/2000 | Moshrefzadeh et al. |

(Continued)

FOREIGN PATENT DOCUMENTS

| CN | 101365735 A | 2/2009 |
| CN | 101699376 A | 4/2010 |

(Continued)

OTHER PUBLICATIONS

Chang, "Patterning of Solution-Processed Semiconducting Polymers in High-Mobility Thin-Film Transistors by Physical Delamination", Advanced Materials, Jun. 2009, vol. 21, No. 24, pp. 2530-2535.

(Continued)

*Primary Examiner* — Ram A Mistry
(74) *Attorney, Agent, or Firm* — James A. Baker

(57) ABSTRACT

A method of patterning a conductive layer to form transparent electrical conductors that does not require etching is disclosed. The method includes peeling a strippable polymer layer from a substrate coated with the conductive layer to pattern the conductive layer. In some embodiments, a resist matrix material is patterned over the conductive layer to prevent removal of the conductive layer beneath the resist matrix material. In other embodiments, a liner having a (Continued)

pressure sensitive adhesive surface is brought into contact with the patterned strippable polymer material to remove both the patterned strippable polymer material and the conductive layer beneath it.

7 Claims, 13 Drawing Sheets

Related U.S. Application Data filed on Mar. 14, 2013, provisional application No. 61/734,793, filed on Dec. 7, 2012.

(51) Int. Cl.
  *G06F 3/041* (2006.01)
  *B82B 1/00* (2006.01)
  *B82Y 15/00* (2011.01)
  *B82Y 40/00* (2011.01)

(52) U.S. Cl.
  CPC ............ *B82Y 15/00* (2013.01); *B82Y 40/00* (2013.01); *G06F 2203/04103* (2013.01); *G06F 2203/04112* (2013.01); *Y10S 977/767* (2013.01); *Y10S 977/887* (2013.01); *Y10S 977/956* (2013.01)

(58) Field of Classification Search
  CPC .......... G06F 2203/04112; G06F 3/041; G06F 3/0412; Y10S 977/797; Y10S 977/887; Y10S 977/956
  USPC .......................................... 345/156, 173–178
  See application file for complete search history.

(56) References Cited

U.S. PATENT DOCUMENTS

| | | | |
|---|---|---|---|
| 6,975,067 B2 | 12/2005 | McCormick | |
| 7,175,876 B2 | 2/2007 | Free | |
| 8,018,568 B2 | 9/2011 | Allemand | |
| 8,049,333 B2 | 11/2011 | Alden | |
| 8,094,247 B2 | 1/2012 | Allemand | |
| 8,390,589 B2 | 3/2013 | Hu | |
| 2003/0203101 A1 | 10/2003 | Haubrich | |
| 2005/0076999 A1 | 4/2005 | Kim | |
| 2005/0196707 A1 | 9/2005 | Cok | |
| 2007/0102682 A1 | 5/2007 | Kodas et al. | |
| 2009/0129004 A1 | 5/2009 | Gruner | |
| 2009/0218310 A1 | 9/2009 | Zu | |
| 2010/0026664 A1* | 2/2010 | Geaghan | G06F 3/044 345/174 |
| 2010/0048804 A1 | 2/2010 | Determan | |
| 2010/0238133 A1 | 9/2010 | Wu et al. | |
| 2010/0295819 A1* | 11/2010 | Ozeki | G06F 3/044 345/174 |
| 2011/0042126 A1 | 2/2011 | Spaid | |
| 2011/0057905 A1* | 3/2011 | Yu | G06F 3/0418 345/174 |
| 2011/0242020 A1 | 10/2011 | Kang et al. | |
| 2012/0031746 A1 | 2/2012 | Hwang et al. | |
| 2012/0094090 A1 | 4/2012 | Yamazaki et al. | |
| 2012/0206376 A1 | 8/2012 | Lin | |
| 2012/0234663 A1* | 9/2012 | Hwang | G06F 3/044 200/600 |
| 2012/0249465 A1 | 10/2012 | Lin et al. | |
| 2013/0278513 A1* | 10/2013 | Jang | G06F 3/044 345/173 |

FOREIGN PATENT DOCUMENTS

| | | |
|---|---|---|
| CN | 102576582 A | 7/2012 |
| JP | 5224818 | 9/1993 |
| JP | 2008-166435 A | 7/2008 |
| JP | 2012-182005 A | 9/2012 |
| JP | 2012178149 | 9/2012 |
| WO | WO 2007-022226 | 2/2007 |
| WO | WO 2007-034994 | 3/2007 |
| WO | WO 2007/111748 | 10/2007 |
| WO | WO 2008-046058 | 4/2008 |
| WO | WO 2009-108306 | 9/2009 |
| WO | WO 2011/001961 | 1/2011 |
| WO | WO 2012-025847 | 3/2012 |
| WO | WO 2013-047301 | 4/2013 |
| WO | WO 2015-061048 | 4/2015 |

OTHER PUBLICATIONS

De, Silver Nanowire Networks as Flexible, Transparent, Conducting Films: Extremely High DC to Optical Conductivity Ratios, ACS Nano, 2009, vol. 3, No. 7, pp. 1767-1774.

Jackman, "Using Elastomeric Membranes as Dry Resists and for Dry Lift-Off", Langmuir, 1999, vol. 15, No. 8, pp. 2973-2984.

Sun, "Polyol Synthesis of Uniform Silver Nanowires: A Plausible Growth Mechanism and the Supporting Evidence", Nano Letters, 2003, vol. 3, No. 7, pp. 955-960.

Sun, "Uniform Silver Nanowires Synthesis by Reducing $AgNO_3$ with Ethylene Glycol in the Presence of Seeds and Poly(Vinyl Pyrrolidone)", Chemistry of Materials, 2002, vol. 14, No. 11, pp. 4736-4745.

Weast, "Handbook of Chemistry and Physics", pp. F140-F141 (1969).

Yu, Metal printing with modified polymer bonding lithography, Applied Physics Letters, Jun. 2006, vol. 88, No. 26, pp. 263517-1-263517-3.

International Search Report for PCT International Application No. PCT/US2013/072624, dated Mar. 5, 2014, 6pgs.

\* cited by examiner

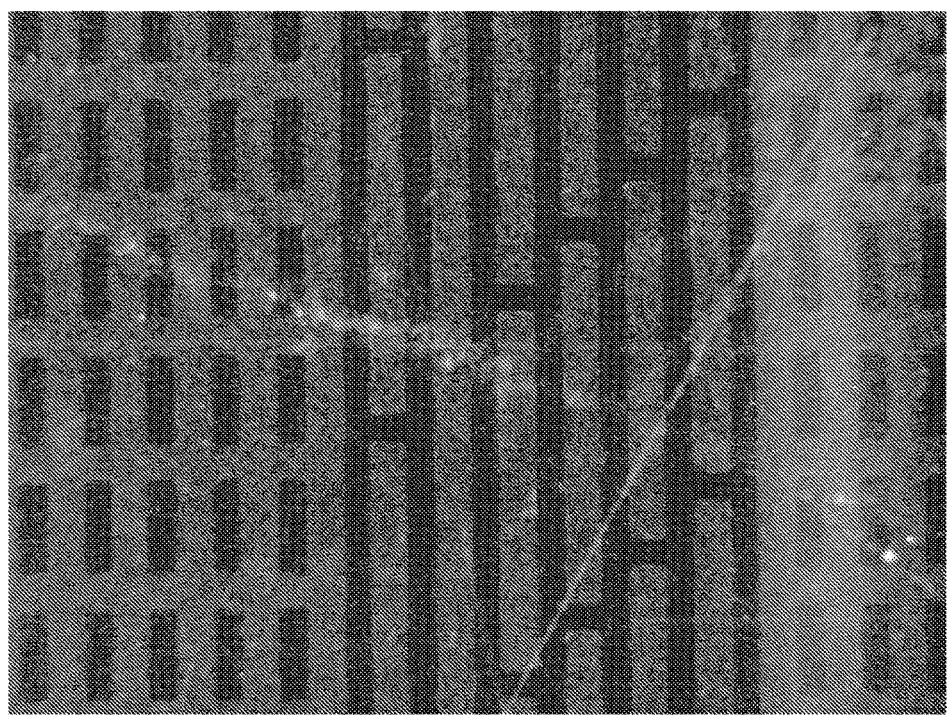
FIG. 8   300 μm

Resist Matrix RI = 1.525
Adhesive RI = 1.47

High Moiré

Resist Matrix RI = 1.525
Adhesive RI = 1.503

Medium Moiré

Resist Matrix RI = 1.525
Adhesive RI = 1.518

Low Moiré

METHOD OF MAKING TRANSPARENT CONDUCTORS ON A SUBSTRATE

CROSS REFERENCE TO RELATED APPLICATIONS

This application is a national stage filing under 35 U.S.C. 371 of PCT/US2013/072624, filed Dec. 2, 2013, which claims priority to U.S. Application No. 61/734,793, filed Dec. 7, 2012; U.S. Application No. 61/782,634, filed Mar. 14, 2013; and U.S. Application No. 61/840,876, filed Jun. 28, 2013, the disclosures of which are incorporated by reference in their entirety herein.

BACKGROUND

Transparent conductors are utilized on touch screens to enable human touch or gesture interactions with computers, smart phones, and other graphics based screen interfaces. Nanowires are one material suitable for making the transparent conductors. For example, PCT International Pub. No. WO 2007/022226 entitled "Nanowires-Based Transparent Conductors" discloses a nanowire material sold by Cambrios Technologies Corporation that can be patterned into a suitable grid to enable the production of touch screens for use with computers.

SUMMARY

Efficient production of touch screen devices requires the ability to pattern (e.g., print) a conductive material into the necessary electrical traces on a substrate. Desirably this process would be performed in a roll-to-roll process where the substrate is unwound, converting operations such as printing and drying/curing are performed, and then the patterned substrate is wound again into a roll for further transport and processing.

There are many conductive materials that could be used in a touch screen, ranging from metals (e.g., open mesh patterns) and metal oxides, such as indium tin oxide (ITO), conductive polymers, such as poly(3,4-ethylenedioxythiophene (PEDOT), or metal nanowires, such as the material described in U.S. Pat. No. 8,049,333. These materials must meet a variety of desired specifications for conductivity and optical transparency. The process outlined in this document discloses a method for patterning such conductive materials to produce low-visibility conductive traces for use in a touch sensor.

There are several approaches to patterning these conductive materials, for example for touch sensors. One approach would be to print the material directly, from a dispersion or ink, using standard printing processes such as ink-jet, gravure, flexographic, or screen printing. This approach is straight forward in that it is able to produce a pattern in one step, with minimal waste. However, variations in the print thickness due to defects such as ribbing and pinholes may produce unacceptable variations in conductivity, as well as negatively impacting the optics of the sensor. An alternative approach is to uniformly coat the surface of the substrate with the conductive material, such as a nanowire material, by forming a substantially continuous nanowire layer and then selectively removing portions of the nanowire layer to create the desired patterned (subtractive patterning). Selective removal is often accomplished either by wet chemical etching or laser ablation. In both cases, one can be limited both by the width of the substrate that can be processed, which is typically less than 30" wide, and by the throughput, which is typically on the order of 1-10 ft/min or less. Also, both etching and laser ablation patterning can present certain process control challenges, related to management of chemical kinetic or photolytic phenomena. As such, a method of subtractive patterning a nanowire layer that does not require etching or laser ablation is needed.

First Embodiment

The inventors have determined that a patterning process can be performed by the following sequence of steps: Coating a substrate with a conductive layer such as a nanowire layer. Optionally hardening or curing the nanowire layer. Applying a pattern on the nanowire layer with a resist matrix material to generate on the substrate one or more first regions of exposed nanowire layer and one or more second regions of the resist matrix material (typically a circuit pattern for a touch screen). Hardening or curing the resist matrix material. Over coating the pattern with a strippable polymer layer. Hardening or curing the strippable polymer layer. Peeling the strippable polymer layer from the substrate, removing the nanowire material in one or more first regions of the substrate and thereby forming a patterned nanowire layer. In another approach, the nanowire material can be replaced with a conductive polymer such as PEDOT and the same process used to pattern the conductive PEDOT layer.

The strippable polymer layer not only provides for efficient production of the necessary conductive patterns over a relatively wide and continuous, indefinite length of substrate thereby allowing the formation of multiple touch screens at a time, it can also be left in place after over coating to provide protection for the nanowire layer. The strippable polymer layer keeps the underlying conductive layer such as a nanowire layer clean, dust free, and protected from scratches (important attributes for a touch screen) during storage and transport. The strippable polymer layer can then be removed just before the next processing step(s) and wound into a roll and recycled.

In the first embodiment, the disclosure provide a method of forming a patterned conductive layer on a substrate including the steps of: coating a substrate with a conductive layer; applying a pattern on the conductive layer with a resist matrix material to generate on the substrate one or more first regions of exposed conductive layer and one or more second regions of resist matrix material; hardening or curing the resist matrix material; over coating the pattern with a strippable polymer layer; hardening or curing the strippable polymer layer; peeling the strippable polymer layer from the substrate, removing the exposed conductive layer from the substrate in the one or more first regions of the substrate, and thereby forming a patterned conductive layer on the substrate.

Second Embodiment

The inventors have determined that a patterning process can also be performed by the following sequence of steps: Coating a substrate with a conductive layer such as a nanowire layer. Optionally hardening or curing the nanowire layer. Applying a pattern on the nanowire layer with a strippable polymer material to generate on the substrate one or more first regions of exposed nanowire layer and one or more second regions of the strippable polymer material (typically the complement of a circuit pattern for a touch screen). Hardening or curing the strippable polymer material. Peeling the strippable polymer layer from the substrate, removing the nanowire layer in one or more second regions of the substrate and thereby forming a patterned nanowire layer. In another approach, the nanowire material can be replaced with a conductive polymer such as PEDOT and the same process used to pattern the conductive PEDOT layer.

Peeling the strippable polymer layer from the substrate can be achieved in one embodiment by first applying a liner to the pattern of strippable polymer material, for example with a liner having a pressure sensitive adhesive thereon, followed by peeling. In such case, the adhesive is contacted to the strippable polymer material, forming a bond with the strippable polymer material, allowing the peeling (separating) liner to separate the strippable polymer material and its underlying nanowire layer from the substrate.

The disclosure provide a method of forming a patterned conductive layer on a substrate including the steps of: coating a substrate with a conductive layer; applying a pattern on the conductive layer with a strippable polymer liquid-forming layer to generate on the substrate one or more first regions of exposed conductive layer and one or more second regions covered with the strippable polymer liquid-forming layer; hardening or curing the strippable polymer liquid-forming layer into a strippable polymer layer; and peeling the strippable polymer layer from the substrate and removing portions of the conductive layer in the one or more second regions of the substrate, and thereby forming a patterned conductive layer on the substrate.

In other embodiments, the patterned transparent conductive layer on a substrate can be used as a component of a touch screen device, the patterned transparent conductor comprising: a transparent substrate; a patterned conductive layer on a major surface of the substrate; a patterned resist matrix material layer attached to the patterned conductive layer having a wavy top surface; and an optically clear adhesive layer applied over the wavy top surface and the major surface of the transparent substrate. In further exemplary embodiments, a touch screen device, for example a cellular telephone, an electronic book, a tablet computer, a computer display, or a television display; incorporates the touch screen component.

Additional exemplary embodiments of the disclosure are described in the following Listing of Exemplary Embodiments:

Listing of Exemplary Embodiments

A. A method of patterning a conductive layer on a substrate, comprising:
  coating a substrate with a conductive layer;
  applying a pattern on the conductive layer with a resist matrix material to generate on the substrate one or more first regions of exposed conductive layer and one or more second regions of resist matrix material;
  hardening or curing the resist matrix material;
  over coating the pattern with a strippable polymer layer;
  hardening or curing the strippable polymer layer;
  peeling the strippable polymer layer from the substrate, removing the exposed conductive layer from the substrate in the one or more first regions of the substrate, and thereby forming a patterned conductive layer on the substrate.
B. The method according to embodiment A, wherein the conductive layer comprises nanowires.
C. The method according to embodiment A or B, wherein over coating the pattern with the strippable polymer layer comprises over coating the one or more first regions and the one or more second regions with a strippable polymer layer-forming liquid.
D. The method according to embodiment C, wherein the strippable polymer layer-forming liquid contacts between 50% to 99% of the exposed conductive layer in the one or more first regions.
E. The method according to embodiment C or D, wherein the strippable polymer layer-forming liquid is selected from the group consisting of polymer solution, monomer, monomer solution, and polymer melt.
F. The method according to embodiment E, wherein the strippable polymer layer-forming liquid comprises a polymer solution and over coating includes slot coating, roll coating, flood coating, notch bar coating, or spraying.
G. The method according to any one of embodiments C, D, E or F, wherein the strippable polymer layer-forming liquid exhibits a viscosity between 10 and 2,500 cps (0.01-2.5 Pa-s).
H. The method according to any one of embodiments C, D, E, F, or G, wherein the strippable polymer layer-forming liquid comprises PVA, an aliphatic polyester-polyurethane copolymer, an ethylene-acrylic acid copolymer, or a combination thereof.
I. The method according to embodiment E, wherein the strippable polymer layer-forming liquid comprises a polymer melt and over coating includes thermal compression lamination.
J. The method according to embodiment I, wherein the strippable polymer layer-forming liquid exhibits a viscosity of between 10,000 and 100,000,000 cps (10 and 100 Pa-s).
K. The method according to any one of embodiments C-J, wherein the strippable polymer layer-forming liquid exhibits a yield stress.
L. The method according to any one of embodiments C-K, wherein the strippable polymer layer-forming liquid exhibits a yield stress less than 100 Pa.
M. The method according to any one of embodiments C-L, wherein the strippable polymer layer-forming liquid is deposited in a pattern over the first and second regions.
N. The method according to embodiment M, wherein the patterned strippable polymer layer-forming liquid is deposited using flexographic, gravure, ink-jet, or screen printing
O. The method according to embodiment N, wherein the patterned strippable polymer layer-forming liquid covers between 50 and 99% of the first and second regions.
P. The method according to any one of embodiments C-O, wherein the resist matrix material contains an ultraviolet curable material.
Q. The method according to any one of embodiments C-P, wherein the strippable polymer layer is from 2 μm to 100 μm thick.
R. The method according to any one of embodiments C-Q, comprising applying an optically clear overlayer over the patterned resist matrix material after removing the strippable polymer layer.
S. The method according to any one of embodiments C-R, wherein the resist matrix material comprises a thickness between 50 nanometers and 50 micrometers.
T. The method according to any one of embodiments C-S, wherein the resist matrix material comprises an index of refraction of between 1.40-1.70.

U. The method according to any preceding embodiment, further comprising coating a lead-forming conductive layer over at least one portion of the patterned conductive layer.

V. The method according to embodiment U, wherein the step of coating the lead-forming conductive layer occurs after the peeling the strippable polymer layer from the substrate.

W. The method according to any one of embodiments U or V, wherein the pattern of the resist matrix material includes interconnect pads, and wherein the lead forming conductive layer is coated above the interconnect pads with the lead-forming conductive layer contacting the patterned conductive layer along its exposed perimeter.

X. The method according to any one of embodiments U, V or W, wherein the interconnect pads are patterned so as increase the length of the exposed perimeter.

Y. The method according to any one of embodiments U, V, W or X, wherein at least one of a void space or a corrugated outer margin is used to increase the length of the exposed perimeter.

Z. The method according to any one of embodiments U, V, W, X or Y, wherein the lead-forming conductive layer is an ink comprising silver particles.

AA. A method of patterning a conductive layer on a substrate, comprising:
coating a substrate with a conductive layer;
applying a pattern on the conductive layer with a strippable polymer liquid-forming layer to generate on the substrate one or more first regions of exposed conductive layer and one or more second regions covered with the strippable polymer liquid-forming layer;
hardening or curing the strippable polymer liquid-forming layer into a strippable polymer layer; and
peeling the strippable polymer layer from the substrate and removing portions of the conductive layer in the one or more second regions of the substrate, and thereby forming a patterned conductive layer on the substrate.

BB. The method according to embodiment AA, wherein the conductive layer comprises nanowires.

CC. The method according to any one of embodiments AA or BB, wherein peeling the strippable polymer layer comprises contacting the strippable polymer layer with a pressure sensitive adhesive surface of a liner and then removing the liner from the substrate.

DD. A component of a touch screen having a patterned transparent conductor comprising:
a transparent substrate;
a patterned conductive layer on a major surface of the substrate;
a patterned resist matrix material layer attached to the patterned conductive layer having a wavy top surface; and
an optically clear adhesive layer applied over the wavy top surface and the major surface of the transparent substrate.

EE. The component according to embodiment DD, wherein the resist matrix material is an ultraviolet curable varnish.

FF. The component according to any one of embodiments DD or EE, wherein the patterned resist matrix material has a thickness between 50 nanometers and 50 micrometers.

GG. The component according to any one of embodiments DD, EE or FF, wherein the patterned resist matrix material has an index of refraction of between 1.40-1.70.

HH. The component according to any one of embodiments DD, EE, FF, or GG, wherein the patterned conductive layer is comprised of a plurality of electrically conductive circuit traces, wherein at least a first portion of the electrically conductive circuit traces are electrically isolated from at least a second portion of the electrically conductive circuit traces.

II. The component according to embodiment HH, wherein the plurality of electrically conductive circuit traces is comprised of a plurality of metal nanowires.

JJ. The component according to any one of embodiments HH or II, wherein the plurality of electrically conductive circuit traces is arranged in an array pattern or a grid pattern.

KK. The component according to any one of embodiments HH, II, or JJ, wherein each of the plurality of electrically conductive circuit traces is separated from an adjacent electrically conductive circuit trace by a gap of at least 1 micrometer, and no more than 10,000 micrometers.

LL. The component according to embodiment KK, wherein the gap is at least 30 micrometers, and no more than 300 micrometers.

MM. The component according to any one of embodiments HH, II, JJ, KK or LL, wherein each of the plurality of electrically conductive circuit traces has a width from 1 micrometer to 1,000 micrometers.

NN. The component according to embodiment MM, wherein each of the plurality of electrically conductive circuit traces has a width from 10 micrometers to 100 micrometers.

OO. The component according to any one of embodiments HH, II, JJ, KK, LL, MM, or NN, wherein the patterned resist matrix material on the patterned conductive layer is comprised of a plurality of hemispherical ridges, each individual hemispherical ridge substantially overlaying a single corresponding electrically conductive circuit trace selected from the plurality of electrically conductive circuit traces, thereby forming the wavy top surface of the patterned resist matrix material.

PP. The component according to any one of embodiments DD, EE, FF, GG, HH, II, JJ, KK, LL, MM, NN, or OO, wherein the patterned resist matrix material layer is attached to the patterned conductive layer by adhesion between the patterned resist matrix material layer and the patterned conductive layer, optionally wherein an optically clear adhesive exhibiting a refractive index difference relative to a refractive index of the patterned resist matrix material layer of 0.05 or less is positioned between the patterned resist matrix material layer and the patterned conductive layer.

QQ. A touch screen device incorporating the component according to any one of embodiments DD, EE, FF, GG, HH, II, JJ, KK, LL, MM, NN, OO, or PP.

RR. The touch screen device of embodiment QQ, selected from the group consisting of a cellular telephone, an electronic book (e-book), a tablet computer, a computer display, or a television display.

Various aspects and advantages of exemplary embodiments of the disclosure have been summarized. The above Summary is not intended to describe each illustrated embodiment or every implementation of the present certain exemplary embodiments of the present disclosure. The Drawings and the Detailed Description that follow more particularly exemplify certain preferred embodiments using the principles disclosed herein.

BRIEF DESCRIPTION OF THE DRAWINGS

The disclosure may be more completely understood in consideration of the following detailed description of various embodiments of the disclosure in connection with the accompanying figures, in which it is to be understood by one of ordinary skill in the art that the present discussion is a description of exemplary embodiments only, and is not intended as limiting the broader aspects of the present disclosure, which broader aspects are embodied in the exemplary construction.

FIG. 8 is a dark field optical photomicrograph of a patterned nanowire layer on a substrate produced by Example 1 (first embodiment).

Figure 1:
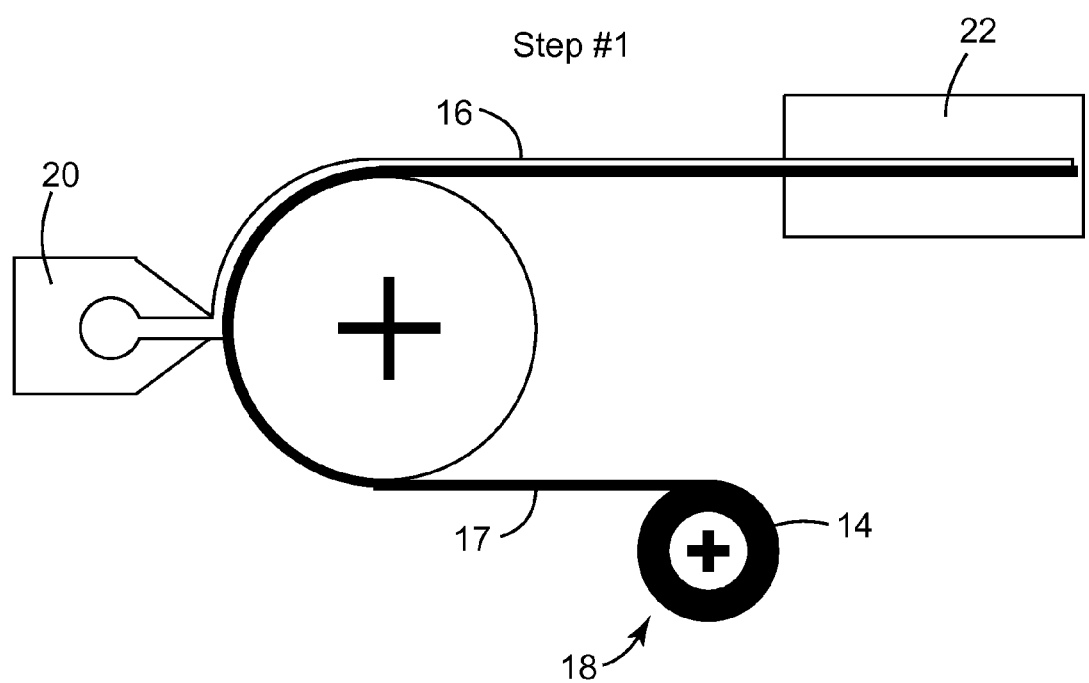
FIG. 1 illustrates a first step in the processes of making a patterned conductive layer on a substrate: coating a conductive layer such as a nanowire layer on a substrate.

Repeated use of reference characters in the specification and drawings is intended to represent the same or analogous features or elements of the disclosure. While the above-identified drawings, which may not be drawn to scale, set forth various embodiments of the present disclosure, other embodiments are also contemplated, as noted in the Detailed Description.

DETAILED DESCRIPTION

As used in this specification and the appended embodiments, the singular forms "a", "an", and "the" include plural referents unless the content clearly dictates otherwise. Thus, for example, reference to fine fibers containing "a compound" includes a mixture of two or more compounds. As used in this specification and the appended embodiments, the term "or" is generally employed in its sense including "and/or" unless the content clearly dictates otherwise.

As used in this specification, the recitation of numerical ranges by endpoints includes all numbers subsumed within that range (e.g. 1 to 5 includes 1, 1.5, 2, 2.75, 3, 3.8, 4, and 5).

Unless otherwise indicated, all numbers expressing quantities or ingredients, measurement of properties and so forth used in the specification and embodiments are to be understood as being modified in all instances by the term "about." Accordingly, unless indicated to the contrary, the numerical parameters set forth in the foregoing specification and attached listing of embodiments can vary depending upon the desired properties sought to be obtained by those skilled in the art utilizing the teachings of the present disclosure. At the very least, and not as an attempt to limit the application of the doctrine of equivalents to the scope of the claimed embodiments, each numerical parameter should at least be construed in light of the number of reported significant digits and by applying ordinary rounding techniques.

Various exemplary embodiments of the disclosure will now be described with particular reference to the Drawings. Exemplary embodiments of the present disclosure may take on various modifications and alterations without departing from the spirit and scope of the disclosure. Accordingly, it is to be understood that the embodiments of the present disclosure are not to be limited to the following described exemplary embodiments, but are to be controlled by the limitations set forth in the claims and any equivalents thereof.

Figure 4:
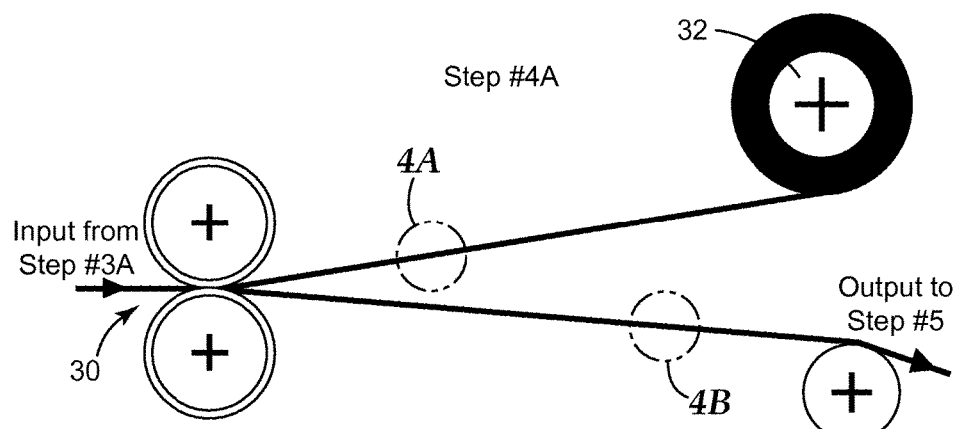
FIG. 4 illustrates a fourth step in the first embodiment process of making a patterned conductive layer on a substrate: peeling the strippable polymer layer from the substrate, removing the conductive layer in the one or more first regions of the substrate, and thereby forming a patterned conductive layer.
Figure 4A:
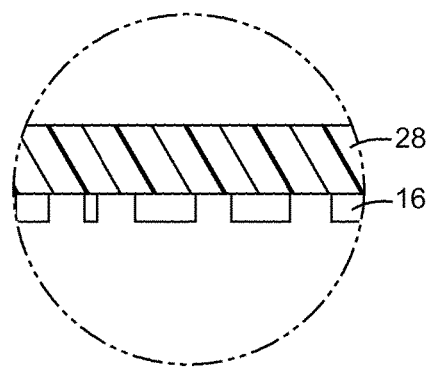
FIG. 4A illustrates a side view of the strippable liner after the fourth step in the first embodiment process.
Figure 4B:
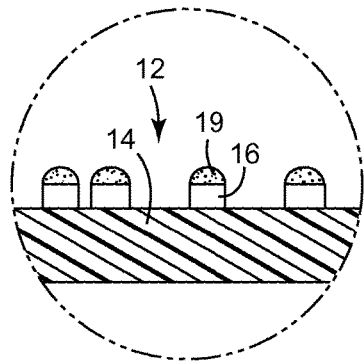
FIG. 4B illustrates a side view of the substrate after the fourth step in the first embodiment process.

Referring now to FIGS. 1 and 4B, a step of making a patterned conductive layer 12 on a substrate 14 is illustrated. The first process step is coating the substrate 14 with a conductive layer 16 such as a nanowire layer or other conductive material such as PEDOT. An unwind 18, unwinds the substrate 14 from a roll and a coater 20 (optionally a sprayer), applies a substantially continuous nanowire layer 16 over a first major surface 17 of the substrate. A drying/curing station 22 can be optionally used to harden or cure the nanowire layer 16 after application by the coater 20.

The nanowire or conductive layer 16 is substantially continuous over at least a portion of the first major surface of the substrate and desirably over at least 50%, 60%, 70%, 80%, or 90% of the first major surface's area. The nanowire or conductive layer may be applied in discrete blocks or rectangles leaving uncoated substrate areas between them with the blocks or rectangles having a size similar to the overall size of the intended touch screen being produced. By "substantially continuous" it is meant the nanowires or conductive material is applied at a sufficient density to render the surface of the substrate conductive, it being recognized that a nanowire layer will comprise individual wires with openings or spaces between them as shown in FIG. 15B in PCT International Pub. No. WO 2007/022226. Optionally, coating the conductive or nanowire layer 16 on a substrate can be achieved by printing into discrete traces or patterns, for example by a flexographic or gravure printing process, leaving uncoated substrate areas between them. Typically, a uniform thickness and continuous coating of conductive material is applied over at least some portion of the substrate, but not necessarily the entire width or length of the substrate. For example, the middle portion of the substrate could be coated while a strip or margin along each edge is left uncoated. The conductive layer or nanowire layer 16 comprises nanowires (metal nanowires or other conductive particles).

Nanowires

Conductive nanowires include metal nanowires and other conductive particles having high aspect ratios (e.g., higher than 10). Examples of non-metallic conductive nanowires include, but are not limited to, carbon nanotubes (CNTs), metal oxide nanowires (e.g., vanadium pentoxide), metalloid nanowires (e.g., silicon), conductive polymer fibers and the like. Nanowires can be described using other terms, such as for example filaments, fibers, rods, strings, strands, whiskers, or ribbons.

As used herein, "metal nanowire" refers to a metallic wire comprising elemental metal, metal alloys or metal compounds (including metal oxides). At least one cross sectional dimension of the metal nanowire is less than 500 nm, or less than 200 nm, and more preferably less than 100 nm. As noted, the metal nanowire has an aspect ratio (length:width) of greater than 10, preferably greater than 50, and more preferably greater than 100. Suitable metal nanowires can be based on any metal, including without limitation, silver, gold, copper, nickel, and gold-plated silver.

The metal nanowires can be prepared by known methods in the art. In particular, silver nanowires can be synthesized through solution-phase reduction of a silver salt (e.g., silver nitrate) in the presence of a polyol (e.g., ethylene glycol) and polyvinyl pyrrolidone). Large-scale production of silver nanowires of uniform size can be prepared according to the methods described in, e.g., Xia, Y. et al., *Chem. Mater.* (2002), 14, 4736-4745, and Xia, Y. et al., *Nanoletters* (2003) 3(7), 955-960. More methods of making nanowires, such as using biological templates, are disclosed in PCT International Pub. No. WO 2007/022226.

Nanowire Dispersion

In certain embodiments, the nanowires are dispersed in a liquid and a nanowire layer on the substrate is formed by coating the liquid containing the nanowires onto the substrate and then allowing the liquid to evaporate (dry) or cure. The nanowires are typically dispersed in a liquid to facilitate more uniform deposition onto the substrate by using a coater or sprayer.

Any non-corrosive liquid in which the nanowires can form a stable dispersion (also called "nanowire dispersion") can be used. Preferably, the nanowires are dispersed in water, an alcohol, a ketone, ethers, hydrocarbons or an aromatic solvent (benzene, toluene, xylene, etc.). More preferably, the liquid is volatile, having a boiling point of no more than 200 degrees C. (° C.), no more than 150 degrees C., or no more than 100 degrees C.

In addition, the nanowire dispersion may contain additives or binders to control viscosity, corrosion, adhesion, and nanowire dispersion. Examples of suitable additives or binders include, but are not limited to, carboxy methyl cellulose (CMC), 2-hydroxy ethyl cellulose (HEC), hydroxy propyl methyl cellulose (HPMC), methyl cellulose (MC), poly vinyl alcohol (PVA), tripropylene gylcol (TPG), and xanthan gum (XG), and surfactants such as ethoxylates, alkoxylates, ethylene oxide and propylene oxide and their copolymers, sulfonates, sulfates, disulfonate salts, sulfosuccinates, phosphate esters, and fluorosurfactants (e.g., Zonyl® by DuPont Company, Wilmington, Del.).

In one example, a nanowire dispersion, or "ink" includes, by weight, from 0.0025% to 0.1% surfactant {e.g., a preferred range is from 0.0025% to 0.05% for Zonyl® FSO-100), from 0.02% to 4% viscosity modifier (e.g., a preferred range is 0.02% to 0.5% for HPMC), from 94.5% to 99.0% solvent and from 0.05% to 1.4% metal nanowires. Representative examples of suitable surfactants include Zonyl® FSN, Zonyl® FSO, Zonyl® FSH, Triton (x100, x114, x45), Dynol (604, 607), n-Dodecyl b-D-maltoside and Novek. Examples of suitable viscosity modifiers include hydroxypropyl methyl cellulose (HPMC), methyl cellulose, xanthan gum, polyvinyl alcohol, carboxy methyl cellulose, hydroxy ethyl cellulose. Examples of suitable solvents that may be present in a nanowire dispersion that includes the aforementioned binders or additives, include water and isopropanol.

If it is desired to change the concentration of the dispersion from that disclosed above, the percent of the solvent can be increased or decreased. In preferred embodiments the relative ratios of the other ingredients, however, can remain the same. In particular, the ratio of the surfactant to the viscosity modifier is preferably in the range of about 80:1 to about 0.01:1; the ratio of the viscosity modifier to the nanowires is preferably in the range of about 5:1 to about 0.000625:1; and the ratio of the nanowires to the surfactant is preferably in the range of about 560:1 to about 5:1. The ratios of components of the dispersion may be modified depending on the substrate and the method of application used. The preferred viscosity range for the nanowire dispersion is between about 1 and 1000 cP (0.001 and 1 Pa-s).

Substrate

"Substrate" refers to a material onto which the conductive layer or nanowire layer is coated or laminated. The substrate 14 can be rigid or flexible. The substrate can be clear or opaque. Suitable rigid substrates include, for example, glass, polycarbonates, acrylics, and the like. Suitable flexible substrates include, but are not limited to: polyesters (e.g., polyethylene terephthalate (PET), polyester naphthalate (PEN), and polycarbonate (PC)), polyolefins (e.g., linear, branched, and cyclic polyolefins), polyvinyls (e.g., polyvinyl chloride, polyvinylidene chloride, polyvinyl acetals, polystyrene, polyacrylates, and the like), cellulose ester bases (e.g., cellulose triacetate, cellulose acetate), polysulphones such as polyethersulphone, polyimides, silicones and other conventional polymeric films, as well as flexible glass substrates (e.g., Willow Glass™ or Gorilla Glass™ available from Corning Glass Corp., Corning, N.Y.)). Additional examples of suitable substrates can be found in, e.g., U.S. Pat. No. 6,975,067.

Optionally, the surface of the substrate can be pre-treated to prepare the surface to better receive the subsequent deposition of the nanowires or the conductive material. Surface pre-treatments serve multiple functions. For example, they enable the deposition of a uniform nanowire dispersion layer. In addition, they can immobilize the nanowires on the substrate for subsequent processing steps. Moreover, the pre-treatment can be carried out in conjunction with a patterning step to create patterned deposition of the nanowires. As described in PCT International Pub. No. WO 2007/02226, pre-treatments can include solvent or chemical washing, heating, deposition of an optional patterned intermediate layer to present an appropriate chemical or ionic state to the nanowire dispersion, as well as further surface treatments such as plasma treatment, ultraviolet radiation (UV)-ozone treatment, or corona discharge.

Step 1: Coating the Substrate with a Nanowire Layer or a Conductive Layer

The nanowire dispersion or conductive layer is applied to the substrate at a given thickness, in an effort to achieve desirable optical and electrical properties. This application is performed using known coating methods, such as slot coating, roll coating, Mayer rod coating, dip coating, curtain coating, slide coating, knife coating, gravure coating, notch bar coating or spraying, yielding a nanowire or conductive layer on the substrate. This coating step can be performed either as a roll-to-roll process or in a piece-part fashion. Following the deposition, the liquid of the dispersion is typically removed by evaporation. The evaporation can be accelerated by heating (e.g., using a dryer). The resulting conductive layer or nanowire layer may require post-treatment to render it more electrically conductive. This post-treatment can be a process step involving exposure to heat, plasma, corona discharge, UV-ozone, or pressure as further described in PCT International Pub. No. WO 2007/02226. Optionally coating the substrate with a conductive layer or nanowire layer can be followed by hardening or curing the conductive layer or nanowire layer.

Optionally, a conductive layer or nanowire layer can be coated onto a substrate by a process wherein the layer is delivered to the substrate surface using means other than liquid dispersion coating. For example, a nanowire layer can be dry-transferred to a substrate surface from a donor substrate. As a further example, nanowires can be delivered to a substrate surface from a gas phase suspension.

In one specific embodiment, a layer of aqueous dispersion of nanowires (Cambrios CLEAROHM™ Ink-N-G4-02, Part Number NKA722, Lot Number 12A0014TC) was applied to a PET substrate in the range 10.0 to 25 µm thick using a slot die coating technique. The coating formulation (e.g. % total solids by wt. and % silver nanowire solids by wt.) can be selected, along with the coating and drying process conditions, to create a nanowire layer with designed electrical and optical properties, e.g. a desired sheet resistance (Ohm/Sq) and optical properties such as transmission (%) and haze (%).

In other embodiments, the conductive layer 16 can comprise a conductive polymer such as PDOT instead of nanowires. A layer of aqueous dispersion of conductive polymer (e.g. Clevios F. E. poly(3,4-ethylenedioxythiophene):poly(styrenesulfonate (PEDOT:PSS)) was applied to a PET film in the range of 10-50 µm thick with a Meyer rod. The coating formulation (e.g. % total solids by wt. and % conductive polymer solids by wt.) can be selected, along with the coating and drying process conditions, to create a conductive layer with designed electrical and optical properties, e.g. sheet resistance (Ohm/Sq) and optical properties transmission (%) and haze (%).

Nanowire Layer

The nanowire layer that results from coating nanowires on a substrate (e.g., from a nanowire dispersion) includes nanowires and optionally binder or additives. The nanowire layer preferably includes an interconnected network of nanowires. The nanowires that make up the nanowire layer are preferably electrically connected to each other, leading approximately or effectively to a sheet conductor. The nanowire layer includes open space between the individual nanowires that make up the layer, leading to at least partial transparency (i.e., light transmission). Nanowire layers having an interconnected network of nanowires with open space between the individual nanowires may be described as transparent conductor layers.

Typically, the optical quality of the nanowire layer can be quantitatively described by measurable properties including light transmission and haze. "Light transmission" refers to the percentage of an incident light transmitted through a medium. In various embodiments, the light transmission of the conductive nanowire layer is at least 80% and can be as high as 99.9%. In various embodiments, the light transmission of the conductive layer such as the nanowire layer is at least 80% and can be as high as 99.9% (e.g., 90% to 99.9%, 95% to 99.5%, 97.5% to 99%). For a transparent conductor in which the conductive layer or nanowire layer is deposited or laminated (e.g., coated) on a substrate (e.g., a transparent substrate), the light transmission of the overall structure may be slightly diminished as compared with the light transmission of the constituent nanowire layer. Other layers that may be present in combination with the conductive layer or nanowire layer and the substrate, such as an adhesive layer, anti-reflective layer, anti-glare layer, may improve or diminish the overall light transmission of the transparent conductor. In various embodiments, the light transmission of the transparent conductor comprising a conductive layer such as a nanowire layer deposited or laminated on a substrate and one or more others layers can be at least 50%, at least 60%, at least 70%, at least 80%, at least 90%, or at least 91%, and may be as high as at least 91% to 99%.

Haze is an index of light diffusion. It refers to the percentage of the quantity of light separated from the incident light and scattered during transmission. Unlike light transmission, which is largely a property of the medium, haze is often a production concern and is typically caused by surface roughness and embedded particles or compositional heterogeneities in the medium. In accordance with ASTM Standard No. D1003-11, haze can be defined as the proportion of transmitted light that is deflected by an angle greater than 2.5 degrees. In various embodiments, the haze of the conductive layer or nanowire layer is no more than 10%, no more than 8%, no more than 5%, no more than 2%, no more than 1%, no more than 0.5%, or no more than 0.1% (e.g., 0.1% to 5% or 0.5 to 2%). For a transparent conductor in which the conductive layer or nanowire layer is deposited or laminated (e.g., coated) on a substrate (e.g., a transparent substrate), the haze of the overall structure may be slightly increased as compared with the haze of the constituent nanowire layer. Other layers that may be present in combination with the conductive layer or nanowire layer and the substrate, such as an adhesive layer, anti-reflective layer, anti-glare layer, may improve or diminish the overall haze of the transparent conductor comprising a nanowire layer. In various embodiments, the haze of the transparent conductor comprising a conductive layer or a nanowire layer deposited or laminated on a substrate can be no more than 10%, no more than 8%, no more than 5%, no more than 2%, no more than 1%, no more than 0.5%, or no more than 0.1% (e.g., 0.1% to 5% or 0.5 to 2%). "Clarity" is the proportion of transmitted light that is deflected by an angle less than 2.5 degrees.

The sheet resistance, transmission, and haze of a conductive layer or a nanowire layer can be tailored by varying certain attributes of the layer and its constituent materials such as the nanowires. Regarding the nanowires, they can be varied, for example, in composition (e.g., Ag, Cu, Cu—Ni alloy, Au, Pd), length (e.g., 1 micrometer, 10 micrometers, 100 micrometers, or greater than 100 micrometers), cross-sectional dimension (e.g., diameter of 10 nanometers, 20 nanometers, 30 nanometers, 40 nanometers, 50 nanometers, 75 nanometers, or greater than 75 nanometers). Regarding the conductive layer comprising the nanowires, it can be varied, for example, in its other components (e.g., cellulosic binders, processing aids such as surfactants, or conductance enhancers such as conducting polymers) or its area density of nanowires (e.g., greater than 10 per square millimeter, greater than 100 per square millimeter, greater than 1000 per square millimeter, or even greater than 10000 per square millimeter). Accordingly, the sheet resistance of the conductive layer or nanowire layer may be less than 1,000,000 Ohm/Sq, less than 1,000 Ohm/Sq, less than 100 Ohm/Sq, or even less than 10 Ohm/Sq (e.g., 1 Ohm/Sq to 1,000 Ohm/Sq, 10 Ohm/Sq to 500 Ohm/Sq, 20 Ohm/Sq to 200 Ohm/Sq, or 25 to 150 Ohm/Sq). The transmission of the conductive layer or nanowire layer may be at least 80% and can be as high as 99.9% (e.g., 90% to 99.9%, 95% to 99.5%, or 97.5% to 99%). The haze of the conductive layer or nanowire layer may be no more than 10%, no more than 8%, no more than 5%, no more than 2%, no more than 1%, no more than 0.5%, or no more than 0.1% (e.g., 0.1% to 5% or 0.5 to 2%).

Resist Matrix Material

The resist matrix material is a material that can be applied to a conductive layer or a nanowire layer on a substrate (e.g., patterned, for example by printing, onto one or more regions of a conductive layer on a substrate), and upon being so applied render the conductive layer more adherent or protected on the substrate (e.g., in one or more regions where the resist matrix material is patterned).

In certain embodiments, the matrix material comprises a polymer and desirably an optically clear polymer. Examples of suitable polymeric resist matrix materials include, but are not limited to: polyacrylics such as polymethacrylates, polyacrylates and polyacrylonitriles, polyvinyl alcohols, polyesters (e.g., polyethylene terephthalate (PET), polyester naphthalate (PEN), and polycarbonates (PC)), polymers with a high degree of aromaticity such as phenolics or cresol-formaldehyde (Novolacs®), polystyrenes, polyvinyltoluene, polyvinylxylene, polyimides, polyamides, polyamideimides, polyetherimides, polysulfides, polysulfones, polyphenylenes, and polyphenyl ethers, polyurethane (PU), epoxy, polyolefins (e.g. polypropylene, polymethylpentene, and cyclic olefins), acrylonitrile-butadiene-styrene copolymer (ABS), cellulosics, silicones and other silicon-containing polymers (e.g. polysilsesquioxanes and polysilanes), polyvinylchloride (PVC), polyacetates, polynorborenes, synthetic rubbers (e.g. EPR, SBR, EPDM), and fluoropolymers (e.g., polyvinylidene fluoride (PVDF), polytetrafluoroethylene (PTFE) or polyhexafluoropropylene), copolymers of fluoro-olefin and hydrocarbon olefin (e.g., Lumiflon®), and amorphous fluorocarbon polymers or copolymers (e.g., CYTOP® by Asahi Glass Co., or Teflon® AF by DuPont Company, Wilmington, Del.).

In other embodiments, the resist matrix material comprises a prepolymer. A "prepolymer" refers to a mixture of monomers or a mixture of oligomers or partial polymers that can polymerize and/or crosslink to form the polymeric matrix, as described herein. It is within the knowledge of one skilled in the art to select, in view of a desirable polymeric matrix, a suitable monomer or partial polymer.

In some embodiments, the prepolymer is photo-curable, i.e., the prepolymer polymerizes and/or cross-links upon exposure to irradiation. Resist matrix materials based on photo-curable prepolymers can be patterned by exposure to irradiation in selective regions, or by selective placement of the prepolymer on the substrate followed by uniform exposure to irradiation. In other embodiments, the prepolymer is thermal-curable, which can be patterned in a similar manner, though exposure to a heat source is used in place of exposure to irradiation.

Typically, the resist matrix material is applied as a liquid. The resist matrix material may optionally comprise a solvent (e.g., during application). Optionally, the solvent may be removed during the application process, for example before over-coating with the strippable polymer layer. Any non-corrosive solvent that can effectively solvate or disperse the matrix material can be used. Examples of suitable solvents include water, an alcohol (e.g., isopropanol), a glycol ether, a ketone, tetrahydrofuran, hydrocarbons (e.g. cyclohexane) or an aromatic solvent (benzene, toluene, xylene, etc.). The solvent can be volatile, having a boiling point of no more than 200° C., no more than 150° C., or no more than 100° C.

In some embodiments, the resist matrix material may comprise one or more additives, including, for example, a cross-linker, a polymerization initiator, stabilizers (including, for example, antioxidants, and UV stabilizers for longer product lifetime and polymerization inhibitors for greater shelf-life), surfactants and the like. Suitable additives are disclosed in co-pending and co-owned U.S. Pat. App. No. 61/894,609, filed Oct. 23, 2013, and titled "SYSTEM AND METHOD FOR MAKING A TEXTURED FILM".

In certain embodiments, the resist matrix material may advantageously include an additive which acts to prevent or reduce the ability to peel the resist matrix material from a substrate surface. In some embodiments, the matrix material may further comprise a corrosion inhibitor.

In some embodiments, the resist matrix material itself is conductive. For example, the matrix can comprise a conductive polymer. Conductive polymers are known in the art, including without limitation: polyanilines, polythiophenes, and polydiacetylenes.

In some embodiments, the resist matrix material has a thickness between about 10 nanometers and 50 micrometers, between about 20 nanometers to 1 micrometer, between about 50 nanometers and 50 micrometers, or between about 50 nanometers to 200 nanometers. In some embodiments, the resist matrix material has a refractive index of between about 1.30 and 2.50, between about 1.40 and 1.70, or between about 1.35 and 1.80.

Strippable Polymer Material

The strippable polymer material is a material that can be applied to a conductive layer or a nanowire layer on a substrate (e.g., coated; or patterned, for example by printing, onto a one or more regions of a conductive layer on a substrate), and upon being so applied render the conductive layer or the nanowire layer removable by peeling (e.g., in one or more regions where the strippable polymer material is patterned). In general, a strippable polymer material applied to a conductive layer or a nanowire layer coated on a substrate is less adherent to the substrate than a resist matrix material applied to the same nanowire layer coated on the substrate. In general, a strippable polymer material applied to a resist matrix material that is applied to a conductive layer or a nanowire layer coated on a substrate is less adherent to the resist matrix material than the resist matrix material is adherent to the conductive layer or nanowire layer coated on the substrate.

Figure 2:
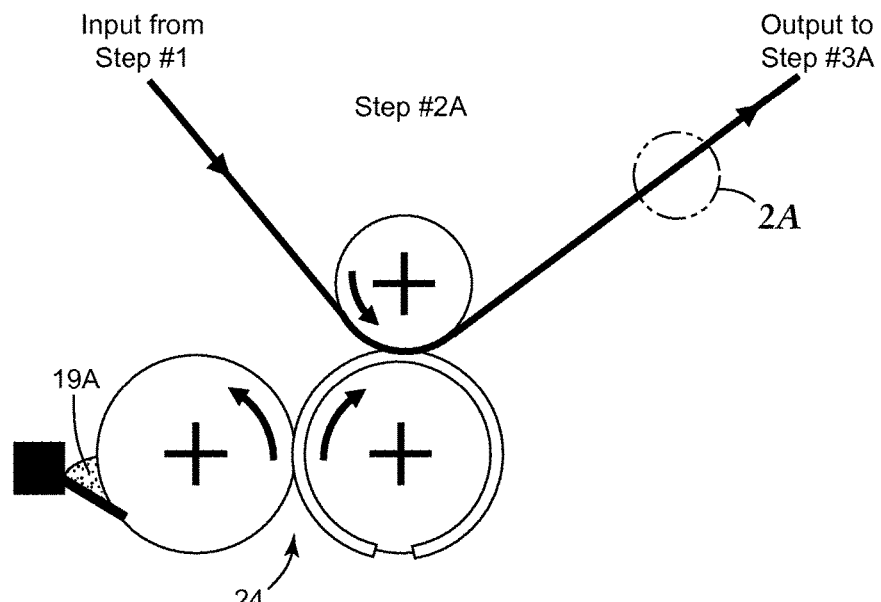
FIG. 2 illustrates a second step in the first embodiment process of making a patterned conductive layer on a substrate: applying a pattern on the conductive layer with a resist matrix material to generate on the substrate one or more first regions of exposed conductive layer and one or more second regions of resist matrix material.

Referring again to FIGS. 2 and 2a, suitable strippable polymer materials readily coat and adhere to the conductive layer or the nanowire layer 16 while not unduly adhering to either the substrate or the resist matrix material such that the layer can be peeled from both the resist matrix material 19A and the substrate 14. The selection of chemical composition for the strippable polymer layer depends on the selection of the substrate, the resist matrix material, and the specific composition of the conductive layer or nanowire layer.

The strippable polymer layer-forming liquid may comprise a film-forming copolymer such as PVA, an aliphatic polyester-polyurethane copolymer, an ethylene-acrylic acid copolymer, or a combination thereof. One particularly suitable strippable polymer layer comprises polyvinyl alcohol (PVA). It has been found in some embodiments that a molecular weight of approximately 8,000 to 9,000 Da for the PVA is preferred. A suitable commercially available coating composition comprising PVA is MacDermid's PRINT & PEEL available from MacDermid Autotype, Inc., Rolling Meadows, Ill. PRINT & PEEL is a water based screen printable varnish designed to be selectively printed onto a range of surface finishes to act as an easily removable protective mask. Surprisingly, it was found that the adhesion of this composition to the nanowire layer 16 was sufficient to completely remove it from the substrate 14 in unwanted areas while readily leaving the nanowire areas covered by the resist pattern 26 attached to the substrate during the subsequent peeling operation. Another commercially available strippable polymer material is Nazdar 303440WB Waterbase Peelable Mask available from Nazdar Ink Technologies, Shawne, Kans.

Yet another suitable strippable polymer layer can be formulated by mixing poly vinyl alcohol (PVA) and Triton X-114 available from Union Carbide (or another suitable surfactant) and deionized water. One suitable formulation can comprise 20% by weight PVA (8,000 to 9,000 Da molecular weight), 2% by weight Triton X-114, and the balance deionized water.

Yet another suitable strippable polymer layer can be formulated using an aliphatic polyester-polyurethane copolymer (e.g., Alberdingk U 801, an aqueous, low viscosity dispersion of an aliphatic polyester-polyurethane copolymer, from Alberdingk Boley, Greensboro, N.C.).

Other suitable strippable polymer layers may be formed using one or more ethylene-acrylic acid copolymer(s) (e.g., Michem Prime 4990R, an ethylene acrylic acid dispersion; Michem Prime 4983R, an ethylene acrylic acid dispersion, and Michem Prime 5931, a modified ethylene acrylic acid dispersion, all available from Michelman, Inc., Cincinnati, Ohio).

First Embodiment

In a first embodiment, a patterning process can be performed by the following sequence of steps: Coating a substrate with a conductive layer or a nanowire layer, as described above. Optionally hardening or curing the conductive layer or nanowire layer. Applying a pattern on the conductive layer or nanowire layer with a resist matrix material to generate on the substrate one or more first regions of exposed conductive layer or exposed nanowire layer and one or more second regions of the resist matrix material (typically a circuit pattern for a touch screen). Hardening or curing the resist matrix material. Over coating the pattern with a strippable polymer layer. Hardening or curing the strippable polymer layer. Peeling the strippable polymer layer from the substrate, removing the conductive layer or nanowire layer in one or more first regions of the substrate and thereby forming a patterned conductive layer or patterned nanowire layer.

Step 2A: Applying a Pattern on the Nanowire Layer with a Resist Matrix Material

Referring again to FIGS. 2 and 2A, once the conductive layer 16 or nanowire layer is coated onto a substrate, a pattern can be applied to the layer with a resist matrix material 19 to generate on the substrate one or more first regions 17 of exposed conductive layer or exposed nanowire layer and one or more second regions 19 of the resist matrix material (typically a circuit pattern for a touch screen).

After coating the substrate 14 with a nanowire layer 16, a pattern on the nanowire layer 16 is applied with a resist matrix material 19. "Resist Matrix Material" refers to a material or a mixture of materials that can cure or harden into a protective layer over the nanowire layer. The resist matrix material adds integrity to the nanowire layer and can promote improved adhesion of the nanowire layer to the substrate. Not wishing to be bound by theory, the following description may be consistent with application of the resist matrix material to the nanowire layer. Since the nanowire layer is typically micro porous with spaces or gaps between individual nanowires, the resist matrix material may simultaneously coat the nanowires and the substrate bonding them to each other and to the substrate. This prevents the resist matrix material from delaminating from the substrate in the subsequent peeling operation of the strippable polymer layer leaving a patterned nanowire layer.

Typically, the resist matrix material is an optically clear material. A material is considered optically clear if the light transmission of the material is at least 80% in the visible region (400 nm-700 nm). Unless specified otherwise, all the layers (including the substrate) described herein are preferably optically clear. The optical clarity of the resist matrix material is typically determined by a multitude of factors, including without limitation: the refractive index (RI), thickness, smoothness, consistency of the RI throughout the thickness, surface (including interface) reflection, and scattering caused by surface roughness and/or embedded particles.

As discussed above, the resist matrix material may be cured and/or hardened into a protective layer in selected regions forming a pattern over the conductive layer or nanowire layer. "Cure or curing", refers to a process where monomers or partial polymers (e.g. oligomers comprising fewer than 150 monomer units) polymerize so as to form a solid polymeric matrix, or where polymers crosslink. Suitable polymerization or cross-linking conditions are well known in the art and include by way of example, heating the monomer, irradiating the monomer with visible or ultraviolet (UV) light, electron beams, and the like. Alternatively, "harden(s) or hardening" may be caused by solvent removal during drying of a resist matrix material, for example without polymerization or cross-linking.

The resist matrix material 19 is patterned by a suitable patterning process. Suitable patterning processes include subtractive methods such as photolithography (wherein the resist matrix material is a photoresist). Suitable patterning processes also include direct printing. Printer 24 is used to form a printed resist matrix material pattern on top of the conductive layer or nanowire layer 16. As discussed above, hardening or curing of the printed resist occurs prior to the next process step. Suitable printers or patterning methods are known and include the illustrated flexographic printer, gravure printing, ink jet printing, screen printing, spray coating, needle coating, photolithographic patterning, and offset printing.

Suitable patterns involve features whose smallest dimension, either width or length, are greater than zero micron such as greater than 0.001 micron and less than 1 micron, less than 10 µm, less than 100 µm, less than 1 mm, or less than 10 mm. Any upper bound on the feature size is limited only by the size of the substrate on which printing occurs. In the case of roll-to-roll printing, this is effectively indefinite in the machine direction of the web. These features can take on any shape that can be patterned, such as stars, squares, rectangles, or circles. Often the features will be parallel lines or a grid sensitive to touch for use as a component in a touch screen.

Step 3A: Over Coating the Patterned Substrate with a Strippable Polymer Layer

Figure 3:
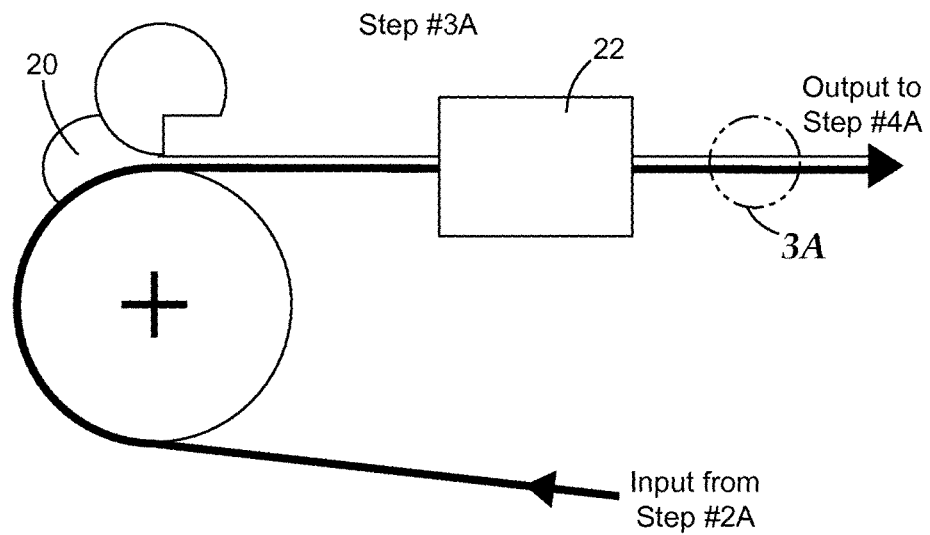
FIG. 3 illustrates a third step in the first embodiment process of making a patterned conductive layer on a substrate: over coating the pattern of resist matrix material with a strippable polymer layer.
Figure 3A:
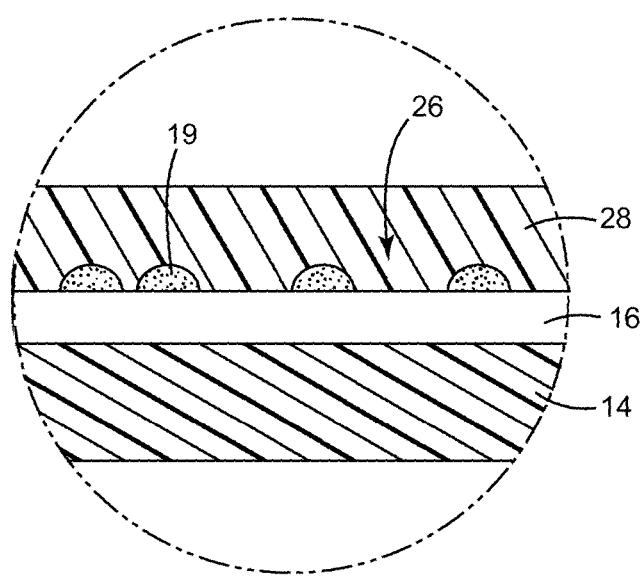
FIG. 3A illustrates a side view of the substrate after the third step in the first embodiment process.

Referring to FIGS. 3 and 3A, the next process step is over coating the substrate 14, having the conductive layer or nanowire layer 16 and patterned resist 26, with a strippable polymer layer 28. Preferably, the strippable polymer layer is delivered to the resist matrix material patterned substrate in a liquid state. The strippable polymer layer is formed by applying a strippable polymer layer-forming liquid to the resist matrix material patterned substrate. A dryer 22 can be optionally used to harden or cure the strippable polymer layer 28 after application by the coater 20. The strippable polymer layer-forming liquid is applied to the substrate using known application methods, such as slot coating, gravure coating, roll coating, flood coating, notch bar coating, spraying, thermal compression lamination, or vacuum lamination.

Figure 2A:
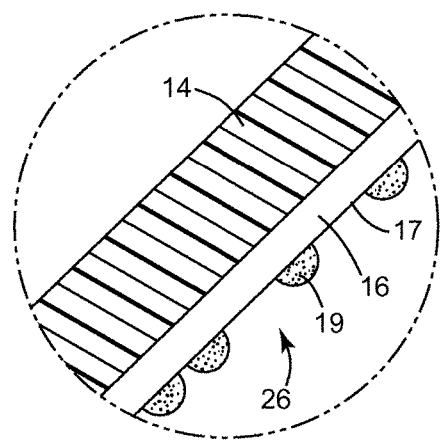
FIG. 2A illustrates a side view of the substrate after the second step in the first embodiment process.

The surface of the substrate having a conductive layer or a nanowire layer and a resist matrix material pattern includes: i) one or more first regions 17 of exposed conductive layer or nanowire layer and ii) one or more second regions 19 of resist matrix material as best seen in FIG. 2A. Generally, the resist matrix material regions are raised with respect to the exposed conductive or nanowire layer regions. Generally, at the border between a resist matrix material region and an exposed conductive or nanowire layer region, a change in relief exists. An example of such a change in relief is a step edge between the exposed conductive or nanowire layer region and the resist matrix material region of the resist matrix material. The step edge may have a height (as approximated by the thickness of the resist matrix material in the aforementioned example) and it may have a lateral extent (e.g., distance, approximately in a plane parallel to the substrate, over which the step edge exists). Depending upon the change in relief, and depending upon the in-plane geometries of the resist matrix material and exposed conductive or nanowire layer regions (e.g., shapes and sizes), making contact to substantially the entire exposed conductive material surface with the strippable polymer layer may be challenging. If a portion of the exposed conductive or nanowire layer region is not contacted by the strippable polymer layer, that portion may not be removed successfully or with high pattern fidelity, during the subsequent peeling step (below). Accordingly, in some embodiments, the strippable polymer-forming liquid layer is applied to the resist matrix material patterned substrate, wherein at least 50%, preferably at least 75%, more preferably at least 90%, more preferably at least 95%, more preferably at least 99%, and most preferably 100% of the exposed conductive or nanowire layer is contacted by the strippable polymer layer material.

Regarding the strippable polymer layer-forming liquid that is delivered to the resist matrix material patterned substrate, it may be a polymer solution, a polymer dispersion, a monomer solution, a monomer, a mixture of monomers, or a melt. The liquid may include minor amounts of secondary components (e.g., photoinitiators, surface active agents, viscosity modifiers). The strippable polymer layer is not delivered as a solid (e.g., a viscoelastic solid, such as a cross-linked pressure sensitive adhesive exhibiting appreciable yield stress that would limit the degree of contact between the adhesive and the exposed conductive or nanowire material in the exposed nanowire material regions). Application of the strippable layer in a liquid state leads to high resolution (high fidelity) patterning of the conductive or nanowire layer after peeling the strippable polymer layer from the resist matrix material patterned substrate.

The viscosity of the strippable polymer layer-forming liquid can be selected with consideration of the application method that will be used to deliver it to the resist matrix material patterned substrate. For example, for slot coating, roll coating, flood coating, notch bar coating, or spraying of a polymer solution, monomer, or monomer solution: the viscosity can be between 1 cps and 10,000 cps (0.001 and 10 Pa-s), preferably between 10 cps and 2,500 cps (0.01 and 2.5 Pa-s). For thermal compression or vacuum lamination of a polymer melt, the viscosity may be between 10,000 cps and 100,000,000 cps (10 Pa-s and 100 kPa-s). The strippable polymer layer-forming liquid preferably has zero yield stress. Some useful strippable polymer layer-forming liquids may develop a very low yield stress, preferably less than 100 Pa, more preferably less than 50 Pa, even more preferably less than 5 Pa, even more preferably less than 1 Pa.

The strippable polymer layer 28 is substantially continuous over at least a portion of the first major surface of the substrate and desirably over at least 50%, 60%, 70%, 80%, or 90% of the first major surface's area. The strippable polymer layer may be applied in discrete blocks or rectangles leaving uncoated substrate areas between them with the blocks or rectangles having a size similar to the overall size of the intended touch screen being produced. By "substantially continuous" it is meant the strippable polymer layer is applied over multiple patterned resist matrix material lines, traces, or discrete features such that the strippable polymer layer covers the not only the patterned resist matrix material 19 but also the conductive or nanowire layer 16 present between the patterned resist matrix material. Typically, a uniform thickness and continuous coating of strippable polymer material is applied over at least some portion of the substrate, but not necessarily the entire width or length of the substrate. For example, the middle portion of the substrate could be coated with the strippable polymer material while a strip or margin along each edge is left uncoated.

The approach described here has several advantages. First, by casting the strippable polymer layer from a liquid, it is possible to create very intimate contact between the strippable polymer layer and the conductive layer or nanowire layer. Second, this intimate contact prevents removed portions of the conductive or nanowire layer from falling onto the substrate after the strippable polymer layer is removed, avoiding contamination of the substrate that could substantially decrease product yields. Finally, after the over coating step, the strippable polymer layer can remain in place during transportation, handling, and converting operations, serving as a protective film and eliminating the need for an additional liner to be applied after the fact, which could be the case if the conductive material or nanowire material were patterned using laser ablation.

Referring again to FIGS. 3 and 3A, the strippable polymer layer is applied with a sufficient thickness to cover both the patterned resist matrix material 26 and the nanowire layer 16. Typical thicknesses for the strippable polymer layer are from 2 to 10 µm, or from 10 µm to 25 µm, or from 25 µm to 100 µm. After applying the strippable polymer layer, the layer is hardened or cured as needed. An optional dryer 22 can be used to speed up the hardening or curing process. A thinner layer of strippable polymer material is preferred, since it requires less energy to remove the solvent from the coating composition, leading to faster drying, and therefore, processing times. However, a minimum dried thickness of strippable polymer is necessary to maintain a stable film during the peeling step.

Step 4A: Peeling the Strippable Polymer Layer from the Substrate

Referring now to FIGS. 4, 4A, and 4B, one process for peeling the strippable polymer layer 28 is illustrated. The substrate 14 with all of the applied layers is run though a delaminating nip 30. The strippable polymer layer 28 with attached conductive or nanowire material in areas of the substrate unprotected by the patterned (e.g., printed) resist matrix material 26 is directed towards a winder 32 and wound into a roll. FIG. 4A illustrates a side view of the strippable polymer layer 28 with the removed nanowires attached that is wound into a roll. The pattern of the removed nanowires on the strippable polymer layer 28 is the reverse image of the patterned resist matrix material 26. FIG. 4B illustrates a side view of the substrate 14 having a patterned nanowire layer 12. Peeling the strippable polymer layer 28 from the substrate 14 removes the conductive material or nanowire material 16 in selected regions of the substrate thereby forming the patterned nanowire layer 12.

Step 5: Optional Application of Optically Clear Overlayer

In direct printing operations, such as those described above, it is typical that a non-uniform, wavy top surface results for the upper surface of the printed layer, such as the resist matrix material. A "wavy top surface" as used herein means that the surface is not optically smooth and has undulations or disturbances in the evenness of the top surface. A wavy top surface will typically have differences in the height of the top surface relative to the average thickness (height) of the printed feature, from 5% to 10% of the average print feature thickness, from 10% to 25% of the average print feature thickness, from 25% to 50% of the average print feature thickness, or from 50% to 100% of the average print feature thickness. For example, a printed feature having an average thickness of 1 µm could have deviations in thickness to the top surface between 0.1 and 0.25 µm, 0.25 and 0.50 µm, 0.50 and 1.0 µm. A 1.0 µm deviation in thickness would be a local hole in the printed feature (pinhole). Because this wavy surface is not optically smooth, it will result in light being scattered or deflected by refraction, and a measurable increase in haze or decrease in clarity. Additionally, this waviness results in a highly visible pattern due to the local nature of the haze, even if extremely fine features are printed. To reduce this effect, in some embodiments an optically clear overlayer is applied over the patterned conductive or nanowire layer with a patterned resist matrix material thereon, in order to planarize any nonuniformities in the surface structure of the printed resist matrix material. An example of a useful optically clear overlayer is an optically clear adhesive (OCA). The optically clear overlayer (e.g., OCA) can be applied by, for example, coating or lamination. Suitable materials for the optically clear overlayer include, for example, silicone adhesives, acrylic adhesives, other acrylic polymers, poly(methyl methacrylate). Preferably, the optically clear adhesive exhibits a refractive index difference relative to the refractive index of the patterned resist matrix material layer of 0.05 or less.

Figure 5:
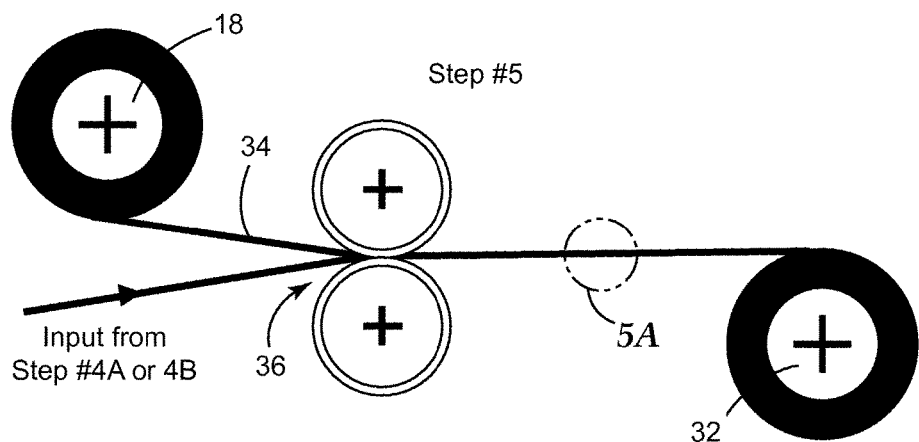
FIG. 5 illustrates an optional fifth step in the first or second embodiment process of making a patterned conductive layer on a substrate: applying an optically clear adhesive layer over the pattern of resist matrix material after peeling the strippable polymer layer.
Figure 5A:
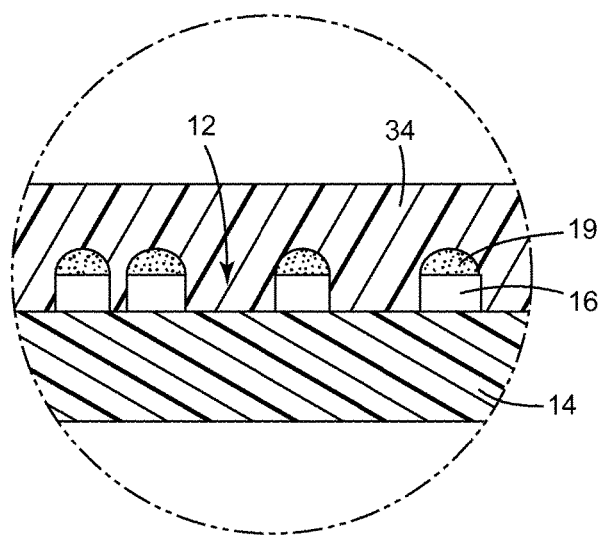
FIG. 5A illustrates a side view of the substrate after the optional fifth step of the first embodiment process.

Referring now to FIGS. 5 and 5A, an optional process step of laminating an optically clear adhesive (OCA) over the patterned conductive or nanowire layer 12 is illustrated. An unwind 18, unwinds the OCA 34 from a roll and a lamination nip 36 applies the OCA over the top of the patterned conductive or nanowire layer 12 and resist matrix material 19 encapsulating the patterned conductive or nanowire layer 12 between the substrate 14 and the OCA layer 34 as shown in FIG. 5A. A winder 32 can be used to wind the substrate with the encapsulated nanowire layer into a roll.

There are several desirable features in reducing the haze and visibility of the patterned conductive or nanowire layer. First, if the optically clear overlayer (e.g., OCA) is applied as a solid film, it is desirable that the thickness of the resist matrix material layer relative to the overlayer (e.g., OCA) is small, with the resist matrix material being, for example, at least a factor of 10 thinner than the overlayer. This thickness relationship can reduce embossing of the upper surface of the overlayer (e.g., OCA), which will again result in a wavy surface and an increase in haze/pattern visibility. It should be noted that this issue will not occur if a liquid overlayer (e.g., OCA) is cast over the pattern as a liquid, as surface tension will result in a uniform overlayer (e.g., OCA) interface, as long as the overlayer layer is thicker than the resist layer. Second, the indices of refraction for the overlayer material and resist matrix material should be as similar as possible, so that the interface between the two minimally scatters, reflects, or refracts light. The difference in the index of refraction between the two layers can be no more than 0.5, no more than 0.3, no more than 0.1, or no more than 0.05.

Second Embodiment

In a second embodiment, a patterning process can be performed by the following sequence of steps: Coating a substrate with a conductive layer or a nanowire layer, as described above. Optionally hardening or curing the conductive or nanowire layer. Applying a pattern on the conductive or nanowire layer with a strippable polymer material to generate on the substrate one or more first regions of exposed conductive or nanowire layer and one or more second regions of the strippable polymer material (typically the complement of a circuit pattern for a touch screen). Hardening or curing the strippable polymer material. Peeling the strippable polymer layer from the substrate, removing the conductive or nanowire layer in one or more second regions of the substrate and thereby forming a patterned conductive or nanowire layer.

Figure 6:
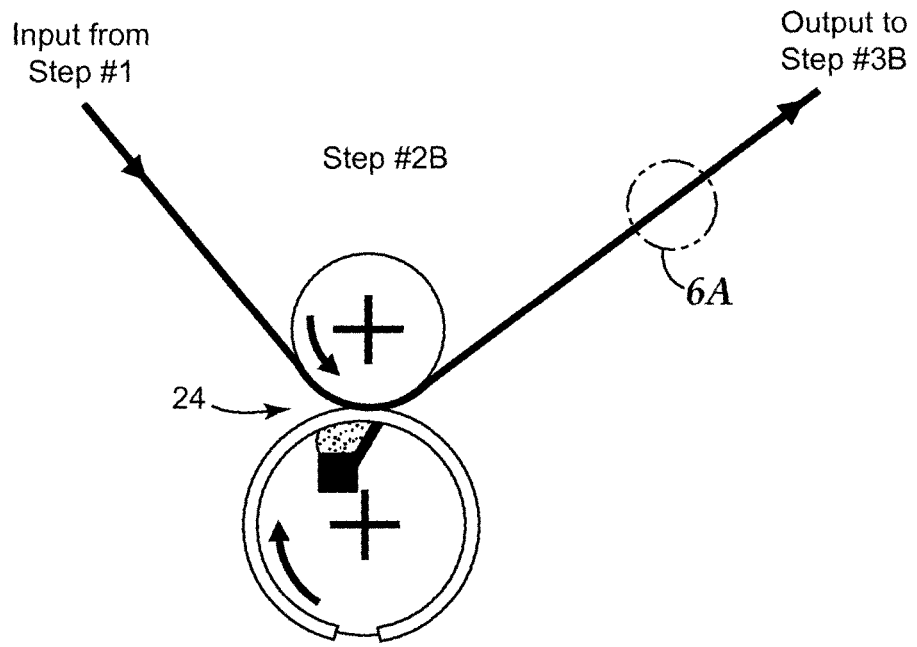
FIG. 6 illustrates a second step in the second embodiment process of making a patterned conductive layer on a substrate: Applying a pattern on the conductive layer with a strippable polymer material to generate on the substrate one or more first regions of exposed conductive layer and one or more second regions of the strippable polymer material.
Figure 6A:
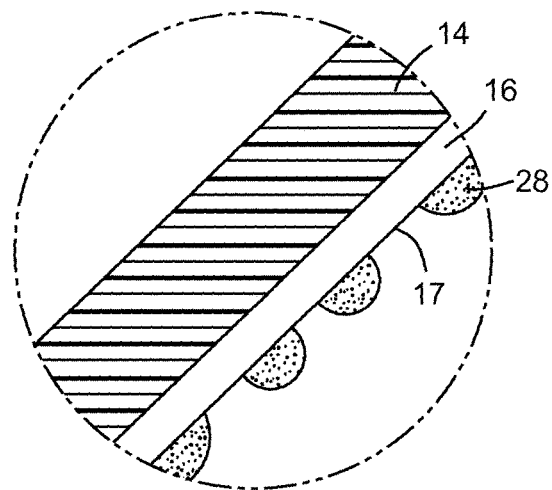
FIG. 6A illustrates a side view of the substrate after the second step in the second embodiment process.

Step 2B: Applying a Pattern on the Conductive Layer with a Strippable Polymer Material Referring now to FIGS. 6 and 6A, once a conductive or a nanowire layer is coated onto a substrate (FIG. 1), a pattern can be applied to the layer with a strippable polymer material 28 to generate on the substrate one or more first regions 17 of exposed conductive layer or exposed nanowire layer and one or more second regions 28 of the strippable polymer material (typically a pattern complementary to a circuit pattern for a touch screen). After coating the substrate 14 with a conductive or a nanowire layer 16, a pattern on the nanowire layer 16 is applied with a strippable polymer material 28.

The strippable polymer material 28 is patterned by a suitable patterning process. Suitable patterning processes include subtractive methods such as photolithography (wherein the strippable polymer material is a photoresist). Preferable patterning processes for the strippable polymer material include direct printing. Printer 24 is used to form a printed strippable polymer material 28 on top of the conductive layer or nanowire layer 16. As discussed above, hardening or curing of the strippable polymer material 28 occurs prior to the next process step. Suitable printers or patterning methods are known and include the illustrated flexographic printer, gravure printing, ink jet printing, screen printing, spray coating, needle coating, photolithographic patterning, and offset printing.

Suitable patterns involve features whose smallest dimension, either width or length, are greater than zero micron such as greater than 0.001 micron and less than 1 micron, less than 10 µm, less than 100 µm, less than 1 mm, or less than 10 mm. Any upper bound on the feature size is limited only by the size of the substrate on which printing occurs. In the case of roll-to-roll printing, this is effectively indefinite in the machine direction of the web. These features can take on any shape that can be patterned, such as stars, squares, rectangles, or circles. Often the features will be parallel lines or a grid sensitive to touch for use as a component in a touch screen. One particular pattern is shown in FIG. 8, which depicts a patterned grid with features and spaces 100 µm wide separated by narrow rectangles 100 µm wide and 500 µm long.

Step 3B: Peeling the Strippable Polymer Layer from the Substrate

Once a pattern of strippable polymer material (strippable polymer layer) is applied to the conductive or nanowire layer, it can be used to pattern the layer in the next step. The strippable polymer material is peeled from the substrate, removing the conductive or nanowire layer in one or more second regions of the substrate and thereby forming a patterned conductive or nanowire layer.

Figure 7:
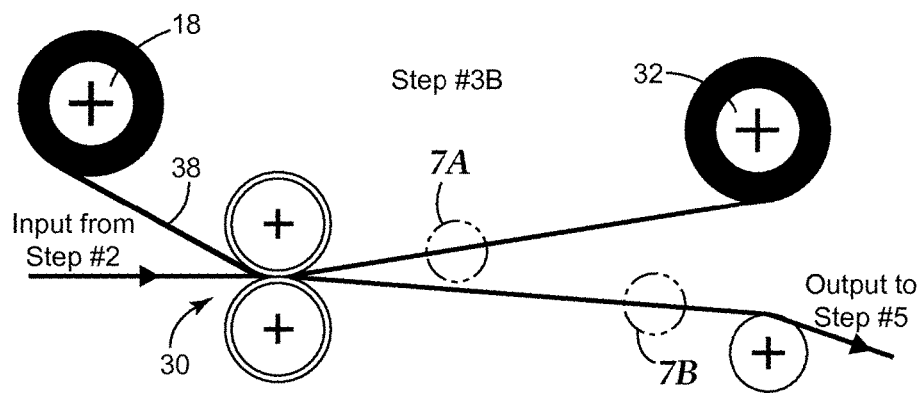
FIG. 7 illustrates a third step in the second embodiment process of making a patterned conductive layer on a substrate: Peeling the strippable polymer layer from the substrate, removing the conductive layer in one or more second regions of the substrate and thereby forming a patterned nanowire layer
Figure 7A:
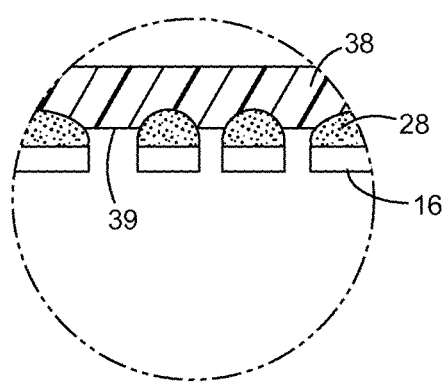
FIG. 7A illustrates a side view of the strippable polymer layer and removed conductive layer after the third step in the second embodiment process.
Figure 7B:
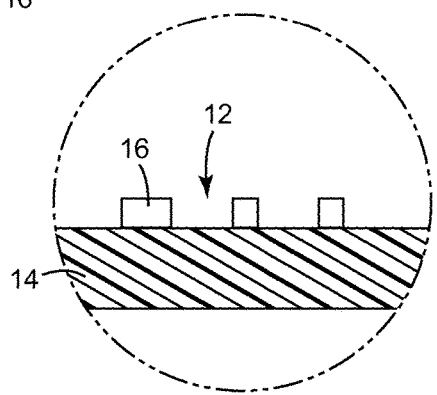
FIG. 7B illustrates a side view of the substrate after the third step in the second embodiment process.

Referring now to FIGS. 7, 7A and 7B, peeling the strippable polymer layer from the substrate can be achieved by first applying a liner 38, having a pressure sensitive adhesive (PSA) surface 39 thereon, to the pattern of strippable polymer material 28 followed by peeling. In such case, the PSA surface 39 contacts the strippable polymer material, forming a bond with the strippable polymer material, allowing the peeling (separating) liner to remove the strippable polymer material and its underlying conductive or nanowire layer from the substrate.

In the peeling step, the liner 38 with the PSA surface 39 is applied to the strippable polymer material 28 by a lamination nip 30. The PSA surface 39 preferentially adheres to the strippable polymer layer removing both the strippable polymer layer and the conductive or nanowire layer 16 from regions having the strippable polymer layer (FIG. 7A). In regions not having the strippable polymer material patterned thereon, the conductive layer or nanowire layer 16 surprisingly remains on substrate 14 (FIG. 7B). It is believed without being bound by theory, that the strippable polymer layer in combination with the thickness of the PSA layer prevents the PSA layer on the liner from contacting the conductive layer or nanowire layer in the exposed regions between the strippable polymer layer.

Alternatively, the adhesion between the conductive layer or nanowire layer and the substrate is greater than the PSA and conductive layer, such that the PSA releases from the conductive or nanowire layer without removing it. As such, during the peeling step, the exposed areas of the conductive or nanowire layer are not removed from the substrate by the liner. After removing the strippable polymer layer, an OCA can be applied as described above and illustrated in FIG. 5 for the first patterning embodiment using a resist matrix material. The optically clear adhesive preferably exhibits a refractive index difference relative to the refractive index of the patterned resist matrix material layer of 0.05 or less, and is positioned between the patterned resist matrix material layer and the patterned conductive layer.

Suitable liners having a PSA surface 39 include any of the 3M tapes used for Comparative Examples C5-C9 and 3M 810 SCOTCH tape.

Alternatively, the liner 38 with the PSA surface 39 can be applied to only a portion of the strippable polymer layer such as to a corner of the first major surface and leaving anther portion of the liner unattached. For example a length of 3M 810 SCOTCH tape can be applied to the corner of the first major surface leaving a tail that is then grabbed and pulled away from the first major surface to start peeling the strippable polymer layer and completing the peeling process by continuing to pull on the removed portions of the strippable polymer layer.

First Embodiment with Leads Suitable for Interconnection

FIG. 4B shows that the traces made of conductive layer 16 are capped above (e.g. overlaid) by second regions 19 of the (typically insulative) resist matrix material. Accordingly, the ordinary skilled artisan might be left wondering how the several portions of conductive layer 16 can be electrically connected to the circuitry which will, e.g. receive and interpret user contact with a touch screen that comprises the conductive layer 16. The applicants have discovered that, surprisingly, adequate electrical contact can be made through the exposed periphery (16a in FIG. 14) of the individual traces of conductive layer 16. Further, some geometries for laying out the pattern of resist matrix material can enhance such a connection.

Figure 12:
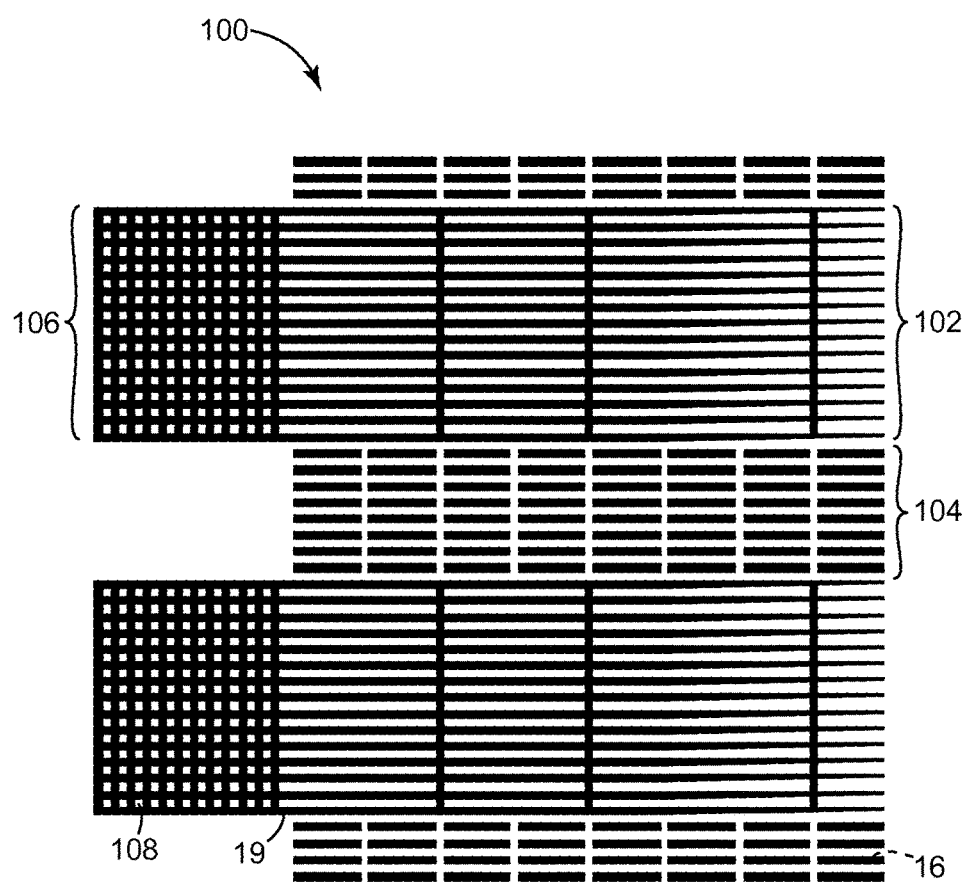
FIG. 12 is a highly magnified plan view of a substrate with a particular pattern after the fourth step in the first embodiment process as depicted in FIG. 4B.

Referring now to FIG. 12 is a highly magnified detail plan view of a substrate after the fourth step in the first embodiment process as in FIG. 4B is illustrated. A portion of an exemplary useful pattern 100 can be seen. In pattern 100, the dark areas represent areas where second regions 19 of resist matrix material are present, with conductive layer 16 hidden below it. Light regions represent where one can see all the way down to the substrate 14. In general, the pattern 100 can be divided in three zones: a trace zone 102, a camouflage zone, 104, and an interconnect pad 106.

A trace zone 102 is in electrical contact with at least one associated interconnect pad 106 (and often a second one, e.g. off to the right as the drawing is oriented). A camouflage zone 104 is not electrically connected to any trace zone 102 interconnect pad 106, but rather to make the adjacent trace zones 102 seem less visually distinctive when the touch panel is viewed by the human eye. The depicted interconnect pad 106 includes numerous void spaces 108 intended to increase the exposed periphery of the conductive layer 16. The void spaces 108 in the depicted embodiment are conveniently squares 100 µm on a side, but the artisan will perceive that other expedients to increase the exposed periphery, such as voids of other shapes and/or corrugated margins for either the void spaces or the exterior periphery of the interconnect pad, can be employed.

Figure 13:
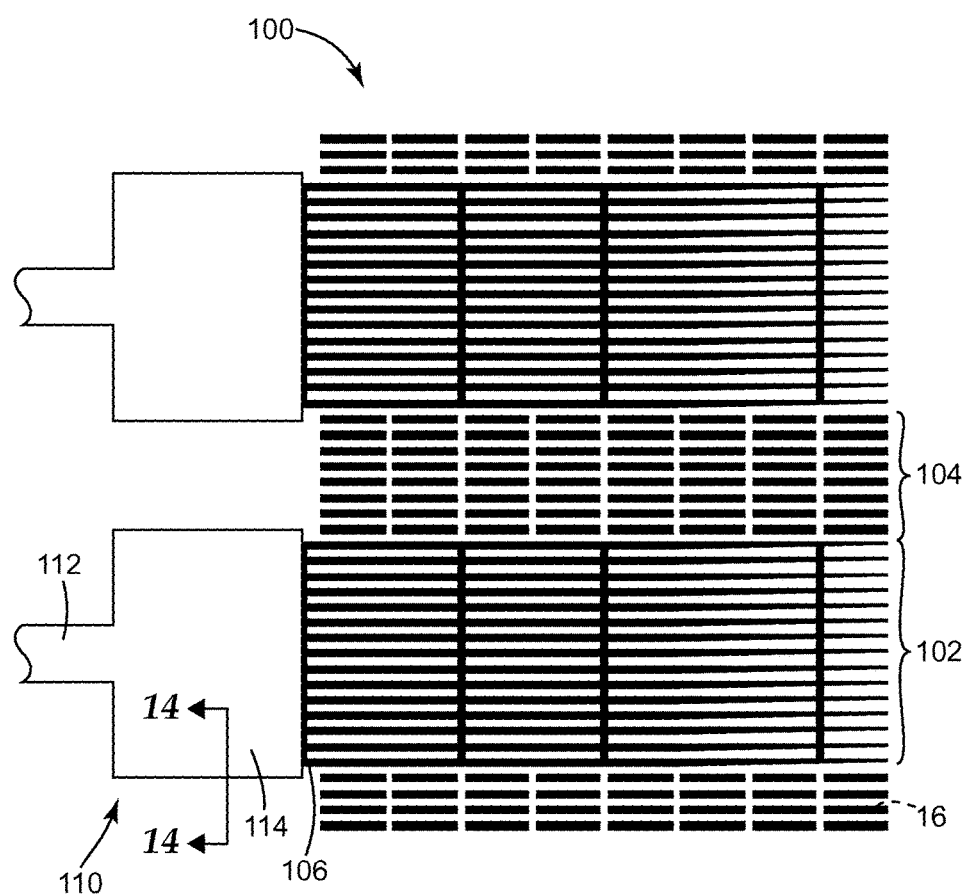
FIG. 13 is a view similar to FIG. 12, except that a layer of lead-forming material has been applied, covering up most of the interconnect pad.

Referring now to FIG. 13, a layer of lead-forming material 110, having a lead portion 112 and a pad portion 114 is depicted covering up most of the interconnect pad 106 of FIG. 12. The lead portion 112 serves to connect the pad portion to, for example, computerized electronics that interpret touches on the touch pad. The layer lead-forming material conveniently comprises a conductive ink, which usually being off the edge of the touch pad, need not be transparent. An ink comprising sub-micron size silver particles is considered particularly convenient. Such inks are conveniently applied, for example, with screen printing, gravure printing, ink jet printing, pad printing or flexographic printing.

Figure 14:
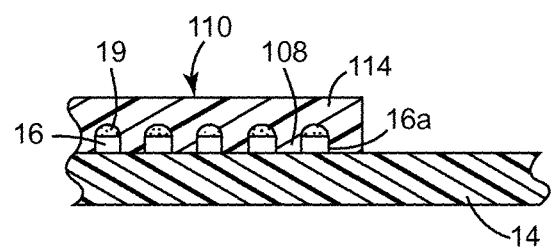
FIG. 14 is a cross-section view taken along section lines 14-14 in FIG. 13.

Referring now to FIG. 14, a cross section view taken along section lines 14-14 in FIG. 13 is illustrated. In this view it can be appreciated that the pad portion 114 of layer of lead-forming material 110 has settled into the void spaces 108, placing lead-forming material 110 into direct electrical contact with the exposed periphery 16a of conductive layer 16 under resist matrix material 19.

Component of a Touch Screen Article

In other embodiments, the patterned transparent conductive layer on a substrate can be used as a component of a touch screen device, the component comprising: a transparent substrate; a patterned conductive layer on a major surface of the substrate; a patterned resist matrix material layer attached to the patterned conductive layer, the patterned resist matrix material having a wavy top surface; and an optically clear adhesive layer applied over the wavy top surface and the major surface of the transparent substrate. In certain such embodiments, the patterned resist matrix material layer is attached to the patterned conductive layer by adhesion between the patterned resist matrix material layer and the patterned conductive layer (i.e. by adhesive forces acting between the patterned resist matrix material and the patterned conductive layer to which the patterned resist matrix material is attached.

In certain presently preferred embodiments of any of the embodiments described herein, the resist matrix material is an ultraviolet curable varnish, as described above and further described in the Examples below. The patterned resist material has a thickness of at least 10 nanometers (nm), 20 nm, 30 nm, 40 nm, or 50 nm; and no greater than 100 micrometers (m), 90 µm, 80 µm, 70 µm, 60 µm, or 50 µm. In some presently preferred embodiments, the patterned resist matrix material has a thickness between 50 nm and 50 µm.

In further presently preferred embodiments, the patterned resist matrix material has an index of refraction of at least 1.35, 1.36, 1.37, 1.38, 1.39, or 1.40; and at most 1.75, 1.74, 1.73, 1.72, 1.71, or 1.70. In some presently preferred embodiments, the patterned resist matrix material has an index of refraction between 1.40 and 1.70.

In additional presently preferred embodiments, the patterned resist matrix material on the patterned conductive layer is comprised of a plurality of hemispherical ridges, each individual hemispherical ridge substantially overlaying a single corresponding electrically conductive circuit trace selected from the plurality of electrically conductive circuit traces, for example as shown in FIGS. 4B, 5A and 14, thereby forming the wavy top surface of the patterned resist matrix material.

In further presently preferred embodiments, the patterned conductive layer is comprised of a plurality of electrically conductive circuit traces, wherein at least a first portion of the electrically conductive circuit traces are electrically isolated from at least a second portion of the electrically conductive circuit traces. In certain such embodiments, the plurality of electrically conductive circuit traces is comprised of a plurality of metal nanowires, as described above and further described in the Examples below. In some presently preferred embodiments, the plurality of electrically conductive circuit traces is arranged in an array pattern or a grid pattern, for example as shown in FIGS. 8 and 12-13.

In certain presently preferred embodiments, each of the plurality of electrically conductive circuit traces is separated from an adjacent electrically conductive circuit trace by a gap of at least 1 micrometer, at least 2.5 µm, at least 5 µm, at least 10 µm, at least 20 µm, or even at least 30 µm; and no more than 10,000 µm, 5,000 µm, 2,500 µm, 1,000 µm, 750 µm, 500 µm, 400 µm, or even 300 µm. In certain presently preferred embodiments, the gap is at least 30 µm and no more than 300 µm; at least 40 µm and no more than 200 µm; or at least 50 µm and no more than 100 µm.

In certain exemplary embodiments, each of the plurality of electrically conductive circuit traces has a width from 1 µm to 1,000 µm. In some presently preferred embodiments of any of the foregoing embodiments, each of the plurality of electrically conductive circuit traces has a width from 2.5 µm to 750 µm; from 5 µm to 500 µm; from 7.5 µm to 250 µm; or even from 10 µm to 100 µm.

Touch Screen Devices

In further exemplary embodiments, the patterned transparent conductive layer on a substrate is incorporated in a touch screen device as a component. Exemplary touch screen devices, which may include, for example, cellular telephones, electronic books (e-books), tablet computers, computer displays, television displays, and the like, are described in U.S. Pat. Nos. 8,094,247 and 8,390,589; U.S. Patent Application Pub. No. 2011/0042126; and PCT International Pub. No. WO 2013/047301.

The operation of various embodiments of the present disclosure will be further described with regard to the following detailed Examples.

EXAMPLES

These Examples are merely for illustrative purposes and are not meant to be overly limiting on the scope of the appended claims. Notwithstanding that the numerical ranges and parameters setting forth the broad scope of the present disclosure are approximations, the numerical values set forth in the specific examples are reported as precisely as possible. Any numerical value, however, inherently contains certain errors necessarily resulting from the standard deviation found in their respective testing measurements. At the very least, and not as an attempt to limit the application of the doctrine of equivalents to the scope of the claims, each numerical parameter should at least be construed in light of the number of reported significant digits and by applying ordinary rounding techniques.

Unless otherwise noted, all parts, percentages, ratios, etc. in the Examples and the rest of the specification are provided on the basis of weight. Solvents and other reagents used may be obtained from Sigma-Aldrich Chemical Company (Milwaukee, Wis.) unless otherwise noted.

Example 1—First Embodiment

A mixture composed of 95% by weight CLEAROHM™ Ink-N G4-02 (available from Cambrios Technologies Corporation, Sunnyvale, Calif.) and 5% by weight isopropyl alcohol (available from Sigma Aldrich, St. Louis, Mo.) was mixed by agitation in a 1 liter clear bottle to yield a coating formulation referred to as a nanowire formulation.

The nanowire formulation was coated 6 inches wide onto 5 mil thick polyethylene terephthalate (PET) substrate (MELINEX ST-504 film, available from DuPont, Wilmington, Del.) using a slot die, targeting a pre-metered wet film thickness of approximately 15.0 µm at a web speed of 10 ft/min to form a nanowire layer on the substrate. The nanowire layer was then heated to a temperature of 105 degrees C. in air impingement oven for approximately 2 minutes, which resulted in a coated and dried transparent and electrically conductive nanowire layer. The optical transmission and haze of the nanowire layer and substrate were measured with a Haze Gard Plus (BYK Gardner USA, Columbia, Md.) and determined to be 92.2% and 1.4%, respectively. The sheet resistance was measured to be between 50 and 75 Ohms/Sq., as determined by a two-point probe measurement.

A patterned UV-curable printing ink (Flint Group UZS00061-408 ink; lot #US-103241160600; Flint Group Print Media North America, Batavia, Ill.) was deposited onto the nanowire-coated substrate by flexographic printing as a resist matrix material, using a patterned photopolymer stamp. The printed pattern consisted of an array 100 µm by 500 µm dashes separated by 100 µm in both the horizontal and vertical directions, adjacent to a patterned mesh composed of 100 µm lines, and the flexographic tool used to make the pattern was fabricated by Southern Graphics Systems (SGS, Minneapolis, Minn.) based on an image that defined the pattern. The resist matrix material was printed at a speed of 5 m/min, using a 1.0 BCM/sq. in. ANILOX roll (rated to give a wet coating of approximately 0.3 to 2.0 µm). The patterned UV-curable printing ink matrix material was irradiated with high intensity UV light in a nitrogen-purged atmosphere with a 236 Watt/cm$^2$ Fusion H bulb (available from Fusion UV Systems, Inc.).

A mixture composed of 99% by weight MacDermid Print and Peel (MacDermid Inc., Denver, Colo.) and 1.0% by weight Triton X-114 surfactant (available from Sigma-Aldrich, St. Louis, Mo.) was prepared for use as the strippable polymer layer. The strippable polymer composition was over-coated onto the patterned resist from the previous step using a #28 Meyer rod (available from R.D. Specialties, Webster, N.Y.), and then placed into an oven to dry for 5 minutes. Once the strippable coating was dry and cooled to room temperature, the film was peeled from the substrate, removing the nanowires in the regions unprotected by the printed resist. Images of the patterned silver nanowire layer, beneath the clear matrix material are shown in FIG. 8. The images were taken with an optical microscope, using "dark field" lighting.

Example 2—Second Embodiment

A mixture composed of 95% by weight CLEAROHM™ Ink-N G4-02 (available from Cambrios Technologies Corporation, Sunnyvale, Calif.) and 5% by weight isopropyl alcohol (available from Sigma Aldrich, St. Louis, Mo.) was mixed by agitation in a 1 liter clear bottle to yield a coating formulation referred to as a nanowire formulation.

The nanowire formulation was coated 6 inches wide onto 5 mil thick polyethylene terephthalate (PET) substrate (MELINEX ST-504 film, available from DuPont, Wilmington, Del.) using a slot die, targeting a pre-metered wet film thickness of approximately 15.0 µm (i.e. 7.0 cc/min flow rate) at a web speed of 10 ft/min to form a silver nanowire layer on the primed side of the MELINEX substrate. The silver nanowire layer was then heated to a temperature of 105 degrees C. in an air impingement oven for approximately 2 minutes, resulting in a coated and dried transparent and electrically conductive silver nanowire layer. The optical Transmission and Haze of the silver nanowire-coated substrate were measured with a Haze Gard Plus (BYK Gardner USA, Columbia, Md.) and determined to be 92.2% and 1.4%, respectively. The sheet resistance was measured to be between 50 and 75 Ohms/Sq.

Figure 9:
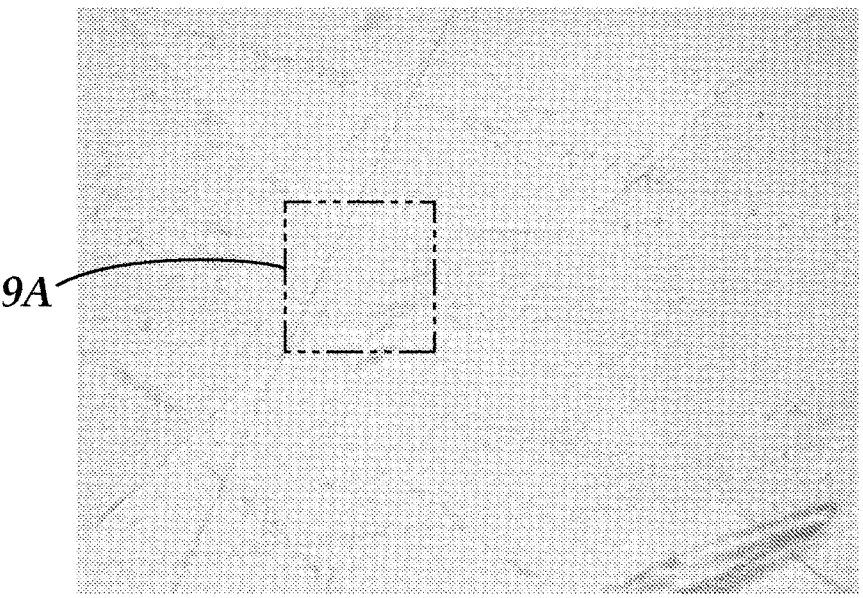
FIGS. 9 and 9A (dark field) are optical photomicrographs of a patterned nanowire layer on a substrate produced by Example 2 (second embodiment).
Figure 9A:

A patterned layer of Autotype Print and Peel (MacDermid Inc., Denver, Colo.) was then screen printed directly onto the nanowire-coated PET substrate using a wire metal screen from Sefar (Depew, N.Y.), and then placed into an oven at 100 degrees C. for 3 minutes to dry. The dried and patterned strippable polymer layer was then mechanically peeled from the substrate, removing silver nanowires directly underneath and attached to the patterned Print and Peel layer. A resultant patterned layer of silver nanowires was left attached to the PET substrate in a negative image to that of the patterned Print and Peel layer. A photo of the patterned nanowire layer is shown in FIG. 9, which includes a blow-up dark field image of the patterned silver nanowires.

Example 3—First Embodiment with Additional Optically Clear Overlay

A HazeGard Plus (BYK Gardner USA, Columbia, Md.) was used to measure the transmission of 91.6%, the haze of 1.2%, and the clarity of 95.5% for the patterned silver nanowire layer and substrate of Example 1. 3M 8171 Optically Clear Adhesive (3M, Saint Paul, Minn.) was laminated to the patterned nanowire layer of the film using a Chem Instruments Hot Roll Laminator (Chemsultant International, Inc., Mentor, Ohio) at 5 ft/min and at room temperature. The adhesive's release liner was removed, and the exposed OCA was used to laminate the substrate, having the patterned nanowire layer, to the primed side of 5 mil ST-504 PET film (DuPont, Wilmington, Del.). The sample was then measured again with the HazeGard Plus, and the transmission, haze, and clarity were 89.1%, 1.2%, and 99.6%, respectively. While there is a slight reduction in transmission, due to the added piece of PET film, the clarity is significantly improved relative to the sample that was not covered with an OCA. This is an indication that the interface between the printed resist and the OCA is optically uniform.

Further evidence of this effect can be observed by using an even thicker printed resist matrix layer. A second sample was produced using an identical procedure to that described in Example 1, except that a 4.0 BCM ANILOX roll, resulting in a wet thickness from 0.3 to 2 µm, was used when patterning a UV curable matrix material. After the strippable polymer layer was removed, this sample had transmission, haze, and clarity values of 91.2%, 1.8%, and 82.0%, respectively. After lamination with 3M 8181 OCA at 5 ft/min, the transmission, haze, and clarity values were 89.1%, 1.8%, and 99.5%, respectively. Again, this drastic increase in the clarity is an indication that the interface between the printed resist and the OCA is optically uniform.

Example 4—Refractive Index Matching of Printed Resist Matrix Material and Optically Clear Overlay to Minimize Moire Interference Between Patterned Nanowire Substrate and an Electronic Display A continuous coating of the Flint Group ink of Example 1 was prepared by coating it on DuPont ST-504 PET (DuPont Company, Wilmington, Del.) with a #4 Meyer Rod (R.D. Specialties, Webster, N.Y.), and irradiating it with a 236 Watt/cm² Fusion H bulb (available from Fusion UV Systems, Inc.) in a nitrogen-purged atmosphere. The refractive index of the cured coating was measured to be 1.525, using a Metricon Refractometer (Model 2010 Prism Coupler, Metricon Corporation, Pennington, N.J.).

Three duplicate patterned silver nanowire substrates were prepared as described in Example 1. Three optically clear adhesives were prepared with three different refractive indices, as measured by an Abbé refractomer (made by Erma, Inc. of Tokyo, Japan) I or described by the product literature: (1) 3M 8171 OCA with refractive index of 1.472; (2) an OCA prepared as described in U.S. Patent Application Pub. No. 2010/0048804 A1 with a refractive index of 1.503; and (3) an OCA prepared as described in U.S. Patent Application Pub. No. 2010/0048804 A1 with a refractive index of 1.518. Each optically clear adhesive was then laminated to one of the three duplicate layers of patterned silver nanowire substrate, such that three separate transparent conductive articles were prepared, as described in Example 3.

Figure 10A:
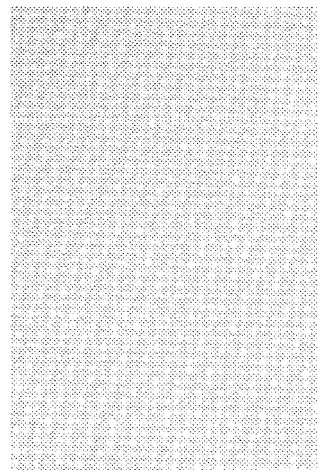
FIGS. 10A-10C are a series of photographs showing the intensity of moiré interference between pattern nanowire articles and an electronic display.
Figure 10B:
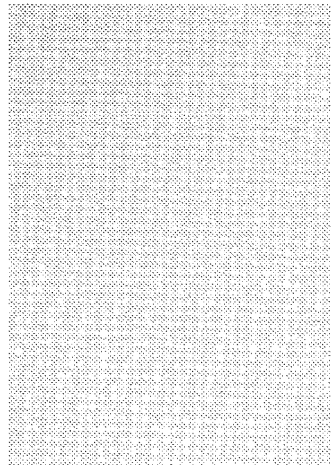
Figure 10C:
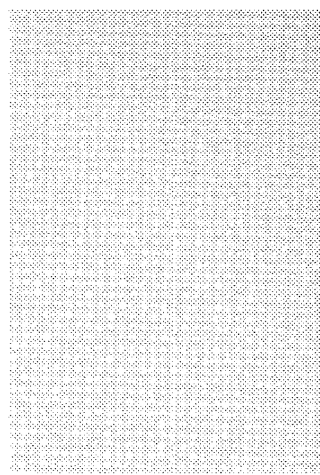

Each sample was then placed in front of the electronic display of a HP Elitebook 8440p laptop at a distance of 1.25 inches (3.18 cm), in order to reveal the presence of Moiré between the patterned resist matrix and nanowire layer and the regular patterns inherent in the laptop liquid crystal display. Table 1 is provided below, which ranks the visual intensity (or amplitude) of the Moire as a function of the refractive index difference between the printed resist matrix material and planarizing optically clear adhesive. It was observed that a smaller jump in refractive index between the printed resist matrix material and the optically clear adhesive resulted in reduced Moiré intensity. FIG. 10 includes optical photographs of the patterned nanowire substrates, laminated to the PET film, overlaying the electronic display.

TABLE 1

| Sample | Flint Group Ink Refractive Index (Dimensionless) | Optically Clear Adhesive Refractive Index (Dimensionless) | Refractive Index Difference (Dimensionless) | Moiré |
|---|---|---|---|---|
| 1 | 1.525 | 1.47 | 0.055 | High |
| 2 | 1.525 | 1.503 | 0.023 | Medium |
| 3 | 1.525 | 1.518 | 0.007 | Low |

Comparative Examples C5-C10

A mixture composed of 95% by weight CLEAROHM™ Ink-N G4-02 (available from Cambrios Technologies Corporation, Sunnyvale, Calif.) and 5% by weight isopropyl alcohol (available from Sigma Aldrich, St. Louis, Mo.) was mixed by agitation in a 1 liter clear bottle to yield a coating formulation referred to as a nanowire formulation.

The nanowire formulation was coated 6 inches wide onto 5 mil thick polyethylene terephthalate (PET) substrate (MELINEX ST-504 film, available from DuPont Company, Wilmington, Del.) using a slot die, targeting a pre-metered wet film thickness of approximately 15.0 µm at a web speed of 10 ft/min to form a nanowire layer on the substrate. The nanowire layer was then heated to a temperature of 105 degrees C. in air impingement oven for approximately 2 minutes, which resulted in a coated and dried transparent and electrically conductive nanowire layer. The optical transmission and haze of the nanowire layer and substrate were measured with a Haze Gard Plus (BYK Gardner USA, Columbia, Md.) and determined to be 92.2% and 1.4%, respectively. The sheet resistance was measured to be between 50 and 75 Ohms/Sq., as determined by a two-point probe measurement.

Figure 11:
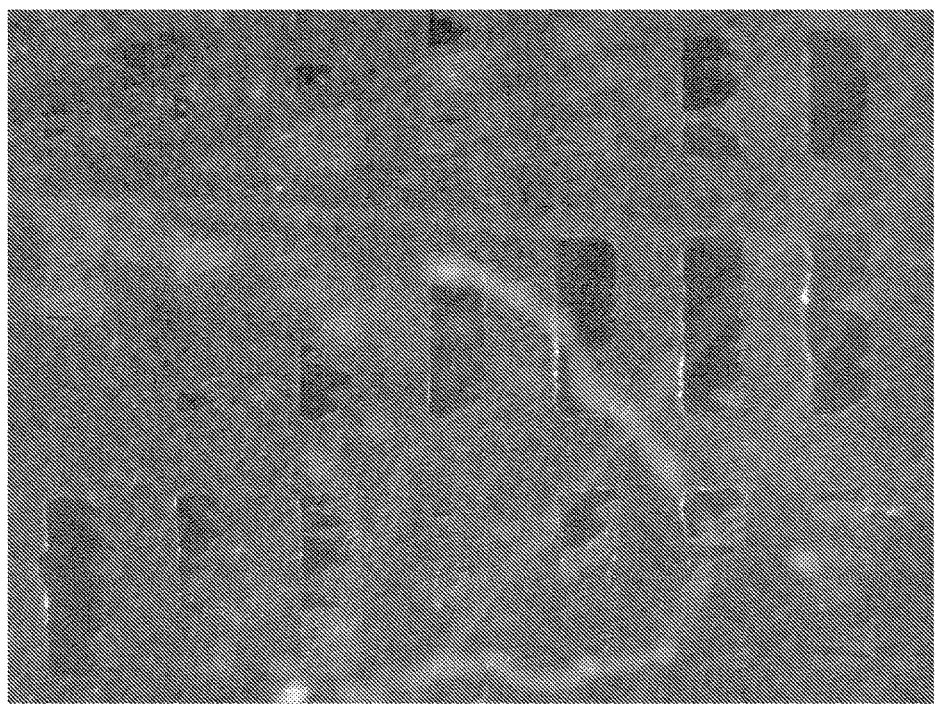
FIG. 11 is a dark field optical photomicrograph of a patterned nanowire layer on a substrate produced by Comparative Example C10.

In order to demonstrate the advantage of over coating a resist matrix material pattern with a strippable polymer layer (e.g., by coating with a strippable polymer layer-forming liquid as described in Example 1), as compared with applying an adhesive tape to the resist matrix material pattern, five 3M tapes were laminated over portions of the printed resist matrix material of the substrate prepared as described in Example 1. Pressure was manually applied to the tapes to ensure they securely adhered to the substrate and then the adhesive tapes were quickly pulled from the resist matrix material patterned over the nanowire layer on the substrate. All but one 3M tape (the full list is compiled in Table 2, below) failed to remove the exposed areas of silver nanowires. The one sample that did remove nanowires did so only in localized regions, but it also remove the printed matrix material resist in some regions, yielding an unacceptable result. The photo in FIG. 11 shows both the localized stripping performed with the 3M VHB tape (Comparative Example C10), and the damage it does to the printed UV-curable resist.

TABLE 2

| Example | 3M Tape | Exposed Silver Nanowires (After Tape Application and Stripping) | UV-Curable Resist (After Tape Application and Stripping) |
|---|---|---|---|
| C5 | #425 Aluminum Tape | Unpeeled | Unpeeled |
| C6 | #535 Packing Tape | Unpeeled | Unpeeled |
| C7 | #898 Fiber Tape | Unpeeled | Unpeeled |
| C8 | #5143 PolyimideTape | Unpeeled | Unpeeled |
| C9 | #1280 Electrical Plating Tape | Unpeeled | Unpeeled |
| C10 | 3M 40 mil VHB Tape | Partial | Partial |

Example 11—Patterned Silver Contact Pad Printed onto Patterned Silver Nanowire Layer A mixture composed of 95% by weight CLEAROHM™ Ink-N G4-02 (available from Cambrios Technologies Corporation, Sunnyvale, Calif.) and 5% by weight isopropyl alcohol (available from Sigma Aldrich, St. Louis, Mo.) was mixed by agitation in a 5 gallon plastic pail liner to yield a coating formulation referred to as a nanowire formulation.

The nanowire formulation was coated 13 inches (33 cm) wide onto 5 mil (about 0.13 mm) thick polyethylene terephthalate (PET) substrate (MELINEX ST-504 film, available from DuPont Company, Wilmington, Del.) using a slot die, targeting a pre-metered wet film thickness between 20 and 25 µm at a web speed of 20 ft/min (6.1 m/min) to form a nanowire layer on the substrate. The nanowire layer was then heated to a temperature of 105° C. in air impingement oven for approximately 2 minutes, which resulted in a coated and dried transparent and electrically conductive nanowire layer. The optical transmission and haze of the nanowire layer and substrate were measured with a Haze Gard Plus (BYK Gardner USA, Columbia, Md.) and determined to be 91.4% and 1.7%, respectively. The sheet resistance was measured to be between 40 and 50 Ohms/Sq. with a Delcom Non-Contact Conductance Meter (Delcom Instruments, Prescott, Wis.).

A patterned UV-curable printing ink (Flint Group UFRO-0061-465U; Flint Group Print Media North America, Batavia, Ill.) was deposited onto the nanowire-coated substrate by flexographic printing as the resist matrix material, using a patterned photopolymer stamp. The printed pattern consisted of an array 100 µm wide lines on a 200 µm pitch, some of which formed a trace zone connected to a interconnect pad 3 mm×2.4 mm that contained 100 µm openings on a 200 µm pitch. A detail of the printed pattern used is depicted in FIG. 12. The flexographic tool (i.e. the photopolymer stamp) used to make the pattern was fabricated by Southern Graphics Systems (SGS, Minneapolis, Minn.) based on an image that defined the pattern. The resist matrix material was printed at a speed of 50 ft/min (15.2 m/min), using a 0.6 BCM/sq. in. ANILOX roll (rated to give a wet coating of approximately 0.3 to 2.0 µm). The patterned UV-curable printing ink matrix material was irradiated and cured with a high intensity UV light in a nitrogen-purged atmosphere.

A mixture composed of 99.75% by weight MacDermid Print and Peel (MacDermid Inc., Denver, Colo.) and 0.25% by weight Triton X-114 surfactant (available from Sigma-Aldrich, St. Louis, Mo.) was prepared for use as the strippable polymer layer. The strippable polymer composition was over-coated onto the patterned resist from the previous step by gravure coating at 20 ft/min (6.1 m/min), using a 36 BCM/sq. in. gravure cylinder (rated to deposit a wet film thickness between 25 and 75 µm) and solidified in an air impingement oven at 275° F. (135° C.). Once the strippable coating was dry and cooled to room temperature, the strippable polymer film was peeled from the substrate, removing the nanowires in the regions unprotected by the printed resist.

An ink comprising sub-micron silver particles (PChem PFI-722 nanosilver ink, PChem, Bensalem, Pa.) was flexographically printed in registration and on top of the meshed interconnect contact pads. The printed silver ink pattern consisted of a 2 mm by 2 mm pad connected to a interconnect lead routed away from the pattern of silver nanowires, and generally resembled the arrangement depicted in FIG. 13. The flexographic tool (i.e. the photopolymer stamp) used to make the printed silver pattern was fabricated by Southern Graphics Systems (SGS, Minneapolis, Minn.) based on an image that defined the pattern. The silver ink was printed at a speed of 50 ft/min (6.1 m/min), using a 2.0 BCM/sq. in. ANILOX roll (rated to give a wet coating of approximately 0.6 to 3.0 µm). The patterned silver ink matrix material was dried and cured by passing the print first through an IR oven and then two air impingement ovens set to 275° F. (135° C.), until the silver ink was solid to the touch.

Example 12—Patterning of Low Resolution Features

A mixture composed of 95% by weight CLEAROHM™ Ink-N G4-02 (available from Cambrios Technologies Corporation, Sunnyvale, Calif.) and 5% by weight isopropyl alcohol (available from Sigma Aldrich) was mixed by agitation in a 1 liter clear bottle to yield a coating formulation, hence referred to as the nanosilver coating formulation.

The nanosilver coating formulation was coated 6 inches (15.24 cm) wide onto 5 mil (about 0.13 mm) thick polyethylene terephthalate (PET) substrate (Melinex ST-504 film, available from DuPont Company, Wilmington, Del.) using pre-metered slot die, targeting a wet film thickness of approximately 17.0 µm at a web speed of 10 ft/min (about 3.1 m/sec). The coated nanosilver formulation was then heated to a temperature of 105° C. in air impingement oven for approximately 2 minutes, which resulted in a coated and dried transparent and electrically conductive layer of silver nanowires. (The optical transmission and haze were measured with a Haze Gard Plus (available from BYK-Gardner) and determined to be 90.2% and 1.8%, respectively. The sheet resistance was to be approximately 25-30 Ohms/Sq., as determined by a two-point probe measurement).

A flexographic printing process was then used to deposit a patterned resist (Flexocure Sigma clear vanish ink, available from Flint Group) onto the coated layer of silver nanowires. The printed pattern consisted of features 5 mm wide, spaced 6.5 mm apart, and the flexographic stamp used to make the pattern was fabricated by Southern Graphics Systems (Minneapolis, Minn.) based on a pdf image that defined the pattern. Additionally, the area between each repeat of the pattern on the stamp was several inches. The resist was printed at a speed of 10 ft/min (about 3.1 m/sec), using an ANILOX roll with an approximate volume of 3 bcm/sq. inch (rated to give a wet coating of approximately 1 to 2 µm). The printed resist was cured in high intensity UV light under a nitrogen-purged atmosphere with a 236 Watt/cm$^2$ Fusion H bulb (available from Heraeus Noblelight Fusion UV Systems, Inc., Gaithersburg, Md.) after the printing step.

A mixture composed of 99.75% by weight MacDermid PRINT & PEEL (available from MacDermid Autotype, Inc. Rolling Meadows, Ill.) and 0.25% Triton X-114 surfactant (available from Sigma-Aldrich Co., St. Louis, Mo.) was deposited over the printed and cured resist from the previous step, using a #28 Meyer rod (available from RD Specialties, Webster, N.Y.), and then placed in an oven to dry for 5 minutes. Once the coating of PRINT & PEEL was dry and cooled to room temperature, the film was peeled from the substrate, such that it lifted off the nanosilver wires in the regions unprotected by the printed resist. Samples were inspected visually, and it was noted that all of the nanowire material had been removed from between the printed features, indicating a patterning resolution from 1 mm to several inches.

Example 13—Patterning of Medium Resolution Features

The process described in Example 12 was followed, with the exception that the printed features imaged into the flexographic printing stamp contained 40 µm wide lines with a gap between adjacent features of 120, 160, 200, 240, or 280 µm. These lines were approximately 2 inches (about 5.1 cm) long. Upon visual inspection, it was noted that all of the nanowire material had been removed. Additionally, silver paste was added to the end of each line, and the resistance of each line was measured, with results listed in Table 2. This example illustrates two significant points. First, that the conductive material is continuous along the length of the pattern, so that it is possible to produce a continuous electrode. Second, this provides further evidence that all of the nanowire material was removed from the space between each printed electrically conductive trace (line), as the resistance of the lines is roughly the same value.

TABLE 3

| Spacing Between Conductive Metal Trace (µm) | 120 | 160 | 200 | 240 | 280 |
|---|---|---|---|---|---|
| Resistance of Conductive Metal Trace (kΩ) | 7.359 | 7.455 | 7.692 | 6.831 | 6.996 |

Example 14—Patterning of High Resolution Features

The process described in Example 12 was followed, with the exception that the printed lines had a width of 10 µm, and a spacing between each line of 30 µm. The samples were inspected visually after the strippable polymer was removed, and it was noted that all of the nanowire material was removed from between the printed electrically conductive traces.

Example 15—Effect of Pattern Resolution on Pattern Visibility

The process described in Example 12 was followed, with the exception that multiple flexographic printing stamps were used, which in this case was composed of roughly 2"×2" (about 5.1 cm×5.1 cm) swatches. Each swatch was then composed of an array of squares of different sizes, including 100, 200, 300, 400, and 500 µm, and at different line spacings, such as 75, 100, 150, 200, and 300 µm. After removal of the strippable polymer layer, an OCA layer (3M 8171) was laminated on top of the pattern to reduce pattern visibility, followed by a cover layer of DuPont ST-504 (DuPont Company, Wilmington, Del.) on the other side of the OCA. The samples were inspected visually, and it was found that pattern visibility was controlled primarily by the spacing between the squares, with a spacing of 200 µm or less producing patterns that, to the naked eye, are substantially uniform, i.e. they do not appear to have a pattern present.

Additionally, it was noted that if the space between the squares is held constant while the size of the square is decreased, the haze can be substantially reduced without sacrificing on pattern visibility, i.e. an array of 100 micron squares spaced 100 µm apart only covers 25% of the film and so will produce a lower-haze pattern than, say, an array of 400 micron squares spaced 100 µm apart, which covers 64% of the film, even though pattern visibility in both cases is good.

While the specification has described in detail certain exemplary embodiments, it will be appreciated that those skilled in the art, upon attaining an understanding of the foregoing, may readily conceive of alterations to, variations of, and equivalents to these embodiments. Other modifications and variations to the present disclosure may be practiced by those of ordinary skill in the art, without departing from the spirit and scope of the present disclosure, which is more particularly set forth in the appended claims. For example, the illustrated methods can be performed by hand or by different processing steps than illustrated herein.

Accordingly, it should be understood that this disclosure is not to be unduly limited to the illustrative embodiments set forth hereinabove. In particular, as used herein, the recitation of numerical ranges by endpoints is intended to include all numbers subsumed within that range (e.g., 1 to 5 includes 1, 1.5, 2, 2.75, 3, 3.80, 4, and 5). In addition, all numbers used herein are assumed to be modified by the term "about."

Furthermore, reference throughout this specification to "one embodiment," "certain embodiments," "one or more embodiments" or "an embodiment," whether or not including the term "exemplary" preceding the term "embodiment" means that a particular feature, structure, material, or characteristic described in connection with the embodiment is included in at least one embodiment of the certain exemplary embodiments of the present disclosure. Thus, the appearances of the phrases such as "in one or more embodiments," "in certain embodiments," "in one embodiment" or "in an embodiment" in various places throughout this specification are not necessarily referring to the same embodiment of the certain exemplary embodiments of the present disclosure. Additionally, the particular features, structures, materials, or characteristics may be combined in any suitable manner in one or more embodiments. Thus, it is further understood that aspects of the various embodiments may be interchanged in whole or part or combined with other aspects of the various embodiments.

All cited references, patents, or patent applications in the above application for letters patent are herein incorporated by reference in their entirety to the same extent as if each individual publication or patent was specifically and individually indicated to be incorporated by reference in a consistent manner. In the event of inconsistencies or contradictions between portions of the incorporated references and this application, the information in the preceding description shall control. The preceding description, given in order to enable one of ordinary skill in the art to practice the claimed disclosure, is not to be construed as limiting the scope of the disclosure, which is defined by the claims and all equivalents thereto.

Various exemplary embodiments have been described. These and other embodiments are within the scope of the following claims.

The invention claimed is:

1. A component of a touch screen having a patterned transparent conductor comprising:
    a transparent substrate;
    a patterned conductive layer comprising a plurality of electrically conductive circuit traces on a major surface of the substrate;
    a patterned resist matrix material layer comprising a hardened or cured photocurable prepolymer attached to the patterned conductive layer, the patterned resist matrix material having a wavy top surface, wherein the patterned resist matrix material on the patterned conductive layer is comprised of a plurality of individual hemispherical ridges, each individual hemispherical ridge overlaying a single corresponding electrically conductive circuit trace selected from the plurality of electrically conductive circuit traces, thereby forming the wavy top surface of the patterned resist matrix material, further wherein each individual hemispherical ridge overlays only an entire top surface of its single corresponding electrically conductive circuit trace; and
    an optically clear adhesive layer applied over the wavy top surface and the major surface of the transparent substrate.

2. The component according to claim 1, wherein at least a first portion of the electrically conductive circuit traces are electrically isolated from at least a second portion of the electrically conductive circuit traces, optionally wherein the plurality of electrically conductive circuit traces is comprised of a plurality of metal nanowires.

3. The component according to claim 2, wherein the plurality of electrically conductive circuit traces is arranged in an array pattern or a grid pattern.

4. The component according to claim 2, wherein each of the plurality of electrically conductive circuit traces is separated from an adjacent electrically conductive circuit trace by a gap of at least 1 micrometer, and no more than 10,000 micrometers.

5. The component according to claim 2, wherein each of the plurality of electrically conductive circuit traces has a width from 1 micrometer to 1,000 micrometers.

6. The component according to claim 1, wherein the patterned resist matrix material layer is attached to the patterned conductive layer by adhesion between the patterned resist matrix material layer and the patterned conductive layer, optionally wherein an optically clear adhesive exhibiting a refractive index difference relative to a refractive index of the patterned resist matrix material layer of 0.05 or less is positioned between the patterned resist matrix material layer and the patterned conductive layer.

7. A touch screen device selected from the group consisting of a cellular telephone, an electronic book, a tablet computer, a computer display, or a television display, incorporating the component according to claim 1.

* * * * *

UNITED STATES PATENT AND TRADEMARK OFFICE
CERTIFICATE OF CORRECTION

PATENT NO. : 10,254,786 B2
APPLICATION NO. : 14/649979
DATED : April 9, 2019
INVENTOR(S) : Dodds et al.

Page 1 of 1

It is certified that error appears in the above-identified patent and that said Letters Patent is hereby corrected as shown below:

In the Specification

Column 4
Line 47, After "printing" insert -- . --.

Column 7
Line 56, After "layer" insert -- . --.

Column 10
Line 18, Delete "gylcol" and insert -- glycol --, therefor.

Column 13
Line 62, Delete "polynorborenes," and insert -- polynorbornenes, --, therefor.

Column 23
Line 46, Delete "(m)," and insert -- (μm), --, therefor.

Column 27
Line 11 (Approx.), Delete "refractomer" and insert -- refractometer --, therefor.

Column 28 (TABLE 2)
Line 34, Delete "PolyimideTape" and insert -- Polyimide Tape --, therefor.

Column 31
Line 63, Delete ""embodiment"" and insert -- "embodiment," --, therefor.

Signed and Sealed this
Thirty-first Day of December, 2019

Andrei Iancu
*Director of the United States Patent and Trademark Office*